United States Patent
Yoshida

(10) Patent No.: US 11,209,707 B2
(45) Date of Patent: Dec. 28, 2021

(54) DISPLAY DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/072,086

(22) Filed: Oct. 16, 2020

(65) Prior Publication Data

US 2021/0116765 A1    Apr. 22, 2021

Related U.S. Application Data

(60) Provisional application No. 62/924,256, filed on Oct. 22, 2019.

(51) Int. Cl.

| G02F 1/1362 | (2006.01) |
|---|---|
| G02F 1/1337 | (2006.01) |
| G02F 1/1368 | (2006.01) |
| G02F 1/1343 | (2006.01) |
| G02F 1/1339 | (2006.01) |

(52) U.S. Cl.
CPC ...... *G02F 1/136286* (2013.01); *G02F 1/1368* (2013.01); *G02F 1/133753* (2013.01); *G02F 1/134309* (2013.01); *G02F 1/136209* (2013.01); *G02F 1/13394* (2013.01); *G02F 1/13629* (2021.01); *G02F 1/13685* (2021.01); *G02F 1/133757* (2021.01); *G02F 2201/123* (2013.01)

(58) Field of Classification Search
None
See application file for complete search history.

(56) References Cited

U.S. PATENT DOCUMENTS

| 5,410,164 | A   | * | 4/1995 | Katayama | ........... G02F 1/13624 |
|---|---|---|---|---|---|
|  |  |  |  |  | 257/59 |
| 2005/0173707 | A1 | * | 8/2005 | Shiraki | .................. H01L 27/12 |
|  |  |  |  |  | 257/72 |
| 2021/0173269 | A1 | * | 6/2021 | Li | ......................... G02F 1/1368 |

FOREIGN PATENT DOCUMENTS

| JP | 07-104311 A |   | 4/1995 |
|---|---|---|---|
| JP | H 07104311 A | * | 4/1995 |
| JP | 2008-003290 A | * | 1/2008 |

* cited by examiner

*Primary Examiner* — Ryan Crockett
(74) *Attorney, Agent, or Firm* — Keating & Bennett, LLP

(57) ABSTRACT

A display device includes a gate wiring; a source wiring; a pixel electrode; a first transistor that has a first gate electrode having a portion of the gate wiring not overlapping the source wiring, a first source electrode, a first drain electrode connected to the pixel electrode, and a first channel region; a second transistor that has a second gate electrode having a portion of the gate wiring intersecting the source wiring, a second source electrode, a second drain electrode separated from the pixel electrode, and a second channel region; and a connectable portion connectable to the second drain electrode and the pixel electrode.

20 Claims, 20 Drawing Sheets

DISPLAY DEVICE

CROSS-REFERENCE TO RELATED APPLICATIONS

The present application claims the benefit of priority to Application No. 62/924,256 filed on Oct. 22, 2019, its entire content of which is incorporated by reference into the present application.

BACKGROUND OF THE INVENTION

Field of the Invention

The technique disclosed in the present specification relates to a display device.

Description of the Related Art

In the related art, as an example of a liquid crystal display device, a device described in Japanese Unexamined Patent Application Publication No. 7-104311 is known. In the liquid crystal display device described in Patent Document 1, a first thin film transistor has a cutting portion that can be electrically separated from a pixel electrode, and a second thin film transistor is provided with a connection portion that can be electrically connected to the pixel electrode in the source electrode path. The second thin film transistor uses the parasitic capacitance of the connection portion to reduce a difference between the scanning line/pixel electrode capacitance in a state where the first thin film transistor is electrically connected to the pixel electrode, and the scanning line/pixel electrode capacitance in a state where the first thin film transistor is electrically separated from the pixel electrode and the second thin film transistor is electrically connected to the pixel electrode instead.

According to the liquid crystal display device described in Patent Document 1 described above, a high yield can be obtained, and a difference in display characteristics between normal pixels and repaired pixels can be reduced. However, the first thin film transistor and the second thin film transistor are disposed between the two signal lines that interpose the pixel electrode. Therefore, it is difficult to install a structure other than the thin film transistor in a region between the two signal lines that interpose the pixel electrode near the scanning line.

SUMMARY

The technique described in the specification of the present application has been completed based on the above circumstances, and an object thereof is to improve the degree of freedom in installing a structure other than a transistor.

(1) A display device according to the technique described in the specification of the present application includes a gate wiring; a source wiring that extends so as to intersect the gate wiring; a pixel electrode that is disposed adjacent to both the gate wiring and the source wiring; a first transistor that includes a first gate electrode continuous with the gate wiring, a first source electrode connected to the source wiring, a first drain electrode connected to the pixel electrode, and a first channel region connected to the first source electrode and the first drain electrode and disposed so as to overlap the first gate electrode via an insulating film, in which the first gate electrode has a portion of the gate wiring not overlapping the source wiring; a second transistor that includes a second gate electrode continuous with the gate wiring, a second source electrode connected to the source wiring, a second drain electrode separated from the pixel electrode, and a second channel region connected to the second source electrode and the second drain electrode and disposed so as to overlap the second gate electrode via an insulating film, in which the second gate electrode has a portion of the gate wiring intersecting the source wiring; and a connectable portion that is connectable to the second drain electrode and the pixel electrode.

(2) In the above display device, in addition to the above (1), the gate wiring is formed of a gate metal film, the source wiring may be formed of a source metal film disposed in a different layer from the gate metal film via an insulating film, in the first transistor and the second transistor, the first channel region and the second channel region may be formed of a semiconductor film so as to be disposed in a different layer from the gate metal film and the source metal film via an insulating film, respectively, at least a portion of the second drain electrode is a source metal portion formed of the source metal film, and a pixel electrode connecting portion formed of the source metal film may be connected to the pixel electrode, and the connectable portion may be formed of the gate metal film and may be disposed so as to overlap the source metal portion and the pixel electrode connecting portion via an insulating film.

(3) In the above display device, in addition to the above (1) or (2), at least two pixel electrodes, each of which is the pixel electrode that is disposed adjacent to both the gate wiring and the source wiring, may be disposed so as to interpose the gate wiring, the display device may further include a second connectable portion that is connectable to one of the pixel electrodes disposed to interpose the gate wiring with respect to the other of the pixel electrodes which is a connection target of the first transistor and the second transistor that are connected to the gate wiring, and that is disposed so as to overlap the first source electrode via an insulating film.

(4) In the above display device, in addition to the above (3), the gate wiring is formed of a gate metal film, the source wiring may be formed of a source metal film disposed in a different layer from the gate metal film via an insulating film, in the first transistor and the second transistor, the first channel region and the second channel region may be formed of a semiconductor film so as to be disposed in a different layer from the gate metal film and the source metal film via an insulating film, respectively, at least a portion of the second drain electrode is a source metal portion formed of the source metal film, a pixel electrode connecting portion formed of the source metal film may be connected to the pixel electrode, and the connectable portion is formed of the gate metal film and is disposed so as to overlap the source metal portion and the pixel electrode connecting portion via an insulating film, and at least a portion of the second connectable portion may be formed of the gate metal film and may be disposed so as to overlap the pixel electrode connecting portion via an insulating film.

(5) In the above display device according to any one of (1) to (4), in the first transistor and the second transistor, the first channel region and the second channel region may be formed of a semiconductor film disposed in a different layer from the source wiring via an insulating film, and the first source electrode, the first drain electrode, the second source electrode, and the second drain electrode may be formed of a resistance lowering region obtained by lowering a resistance in a portion of the semiconductor film.

(6) In the above display device, in addition to the above (5), the gate wiring, the first gate electrode, and the second gate electrode may be formed of a gate metal film disposed on an upper layer side of the semiconductor film via an insulating film, and a portion of the semiconductor film not overlapping the gate metal film may be the resistance lowering region.

(7) In the above display device, in addition to the above (6), the first transistor may include a lower layer side first gate electrode that is formed of a lower layer side gate metal film disposed on a lower layer side of the semiconductor film via an insulating film, that is disposed so as to overlap the first channel region, and that is connected to the first gate electrode, and the second transistor may include a lower layer side second gate electrode that is formed of the lower layer side gate metal film, that is disposed so as to overlap the second channel region, and that is connected to the second gate electrode.

(8) In addition to the above (7), the above display device may further include a lower layer side gate wiring that is formed of the lower layer side gate metal film, that is disposed so as to overlap the gate wiring, and that is connected to the gate wiring, the lower layer side first gate electrode, and the lower layer side second gate electrode.

(9) In addition to any one of (5) to (8), the above display device may further be formed of a resistance lowering source wiring that has the resistance lowering region, that is disposed so as to overlap the source wiring, and that is connected to the source wiring.

(10) In the above display device, in addition to any one of the above (1) to (9), a widened portion may be provided in the gate wiring at a position not overlapping the source wiring.

(11) In addition to the above (10), the above display device may further include a liquid crystal layer; and a spacer that is disposed to penetrate the liquid crystal layer and holds a thickness of the liquid crystal layer, the spacer being disposed so as to overlap the widened portion.

(12) In addition to any one of (1) to (11), the above display device may further include a liquid crystal layer that includes liquid crystal molecules; a plurality of domains having different alignment directions of the liquid crystal molecules when a voltage is applied to the liquid crystal layer; an alignment boundary portion that is located at a boundary of the plurality of domains; an alignment film that aligns the liquid crystal molecules; and a pixel electrode connecting portion that is connected to the pixel electrode and is connectable to the connectable portion, in which the alignment boundary portion may be configured to include a first alignment boundary portion extending along an extending direction of the gate wiring and a second alignment boundary portion extending along an extending direction of the source wiring, and the pixel electrode connecting portion may have a light shielding property and may be disposed so as to overlap the first alignment boundary portion and the second alignment boundary portion.

(13) In the above display device, in addition to the above (12), the connectable portion may be disposed so as to overlap at least a portion of an obtuse-angled edge portion which is an edge portion included in an outer peripheral edge portion of the pixel electrode and in which an azimuth direction orthogonal to the edge portion and directed toward an inside of the pixel electrode forms an obtuse angle with respect to a tilt direction of the liquid crystal molecules when a voltage is applied to the liquid crystal layer.

(14) In addition to the above (13), the above display device may further include a capacitance forming portion that is disposed so as to overlap the pixel electrode connecting portion via an insulating film; and an edge light shielding portion that is continuous with the capacitance forming portion and that is disposed so as to overlap at least a portion of the obtuse-angled edge portion.

(15) In the above display device, in addition to the above (14), the edge light shielding portion may include a first edge light shielding portion continuous with a portion of the capacitance forming portion overlapping the first alignment boundary portion, and a second edge light shielding portion continuous with a portion of the capacitance forming portion overlapping the second alignment boundary portion, and the second edge light shielding portion may be disposed at a position interposing the second alignment boundary portion between the second edge light shielding portion and the connectable portion.

Advantageous Effects of Invention

According to the technique described in the specification of the present application, it is possible to improve the degree of freedom in installing a structure other than a transistor.

DESCRIPTION OF EMBODIMENTS

Embodiment 1

Embodiment 1 will be described with reference to FIGS. 1 to 14. In the present embodiment, an array substrate 10A that constitutes a liquid crystal panel (display device) 10 will be exemplified. An X axis, a Y axis, and a Z axis are illustrated in a portion of each drawing, and each axis direction is drawn so as to be the direction illustrated in each drawing. The upper sides of FIGS. 3, 4, 6, 10, 12, 13, and 14 are front sides, and the lower sides are rear sides.

Figure 1:
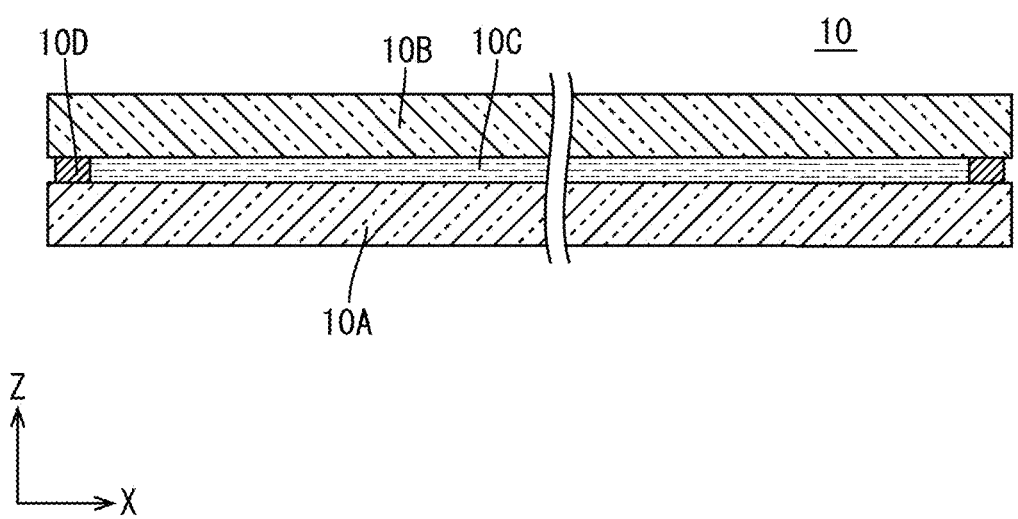
FIG. 1 is a cross-sectional view of a liquid crystal panel according to Embodiment 1.

FIG. 1 is a schematic cross-sectional view of the liquid crystal panel 10. As illustrated in FIG. 1, the liquid crystal panel 10 is provided with an array substrate 10A, a CF substrate (counter substrate) 10B disposed to face the array substrate 10A, a liquid crystal layer 10C interposed between the substrates 10A and 10B, and a seal portion 10D that surrounds the liquid crystal layer 10C and seals the liquid crystal layer 10C. In the present embodiment, a negative liquid crystal material having a negative anisotropy of dielectric constant is used as the liquid crystal material included in the liquid crystal layer 10C. Polarizing plates (not illustrated) are attached to the outer surface side of both substrates 10A and 10B. The liquid crystal panel 10 according to the present embodiment is assumed to have a screen size of, for example, approximately 70 inches (for example, 69.7 inches) and a resolution of "7680×4320" corresponding to 8K resolution.

Figure 2:
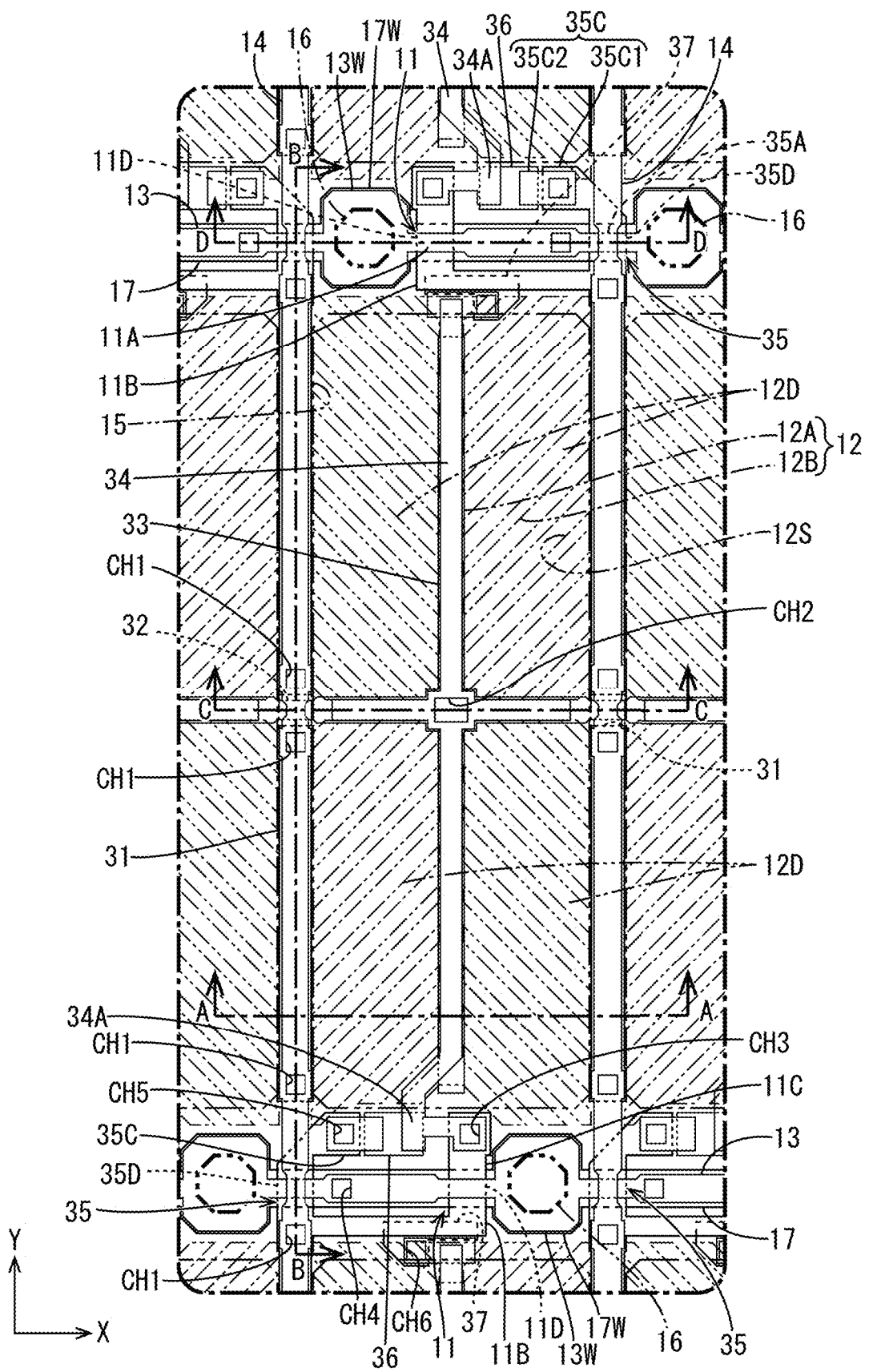
FIG. 2 is a plan view illustrating a pixel array on an array substrate that constitutes the liquid crystal panel.

The liquid crystal panel 10 is divided into a display region whose display surface can display an image and a non-display region surrounding the display region. FIG. 2 is a plan view of the display region on the array substrate 10A. FIG. 2 also illustrates a portion of the configuration on the CF substrate 10B side. In the display region of the array substrate 10A, as illustrated in FIG. 2, a plurality of first transistors 11 and a plurality of pixel electrodes 12 are provided side by side in a matrix along the X axis direction (first direction) and the Y axis direction (second direction). Around the pixel electrodes 12, gate wirings (scanning wirings) 13 and source wirings (image wirings, signal wirings) 14 that are disposed in a substantially lattice-shaped are disposed so as to surround the pixel electrodes 12. The gate wiring 13 extends along the X axis direction, whereas the source wiring 14 extends along the Y axis direction, and both wirings 13 and 14 are orthogonal (intersect) to each other. The gate wirings 13 are arranged in the same number as the number of the pixel electrodes 12 arranged in the Y axis direction so as to be alternately and repeatedly arranged with the pixel electrodes 12 in the Y axis direction. On the lower layer side of the gate wiring 13, a lower layer side gate wiring 17 is provided so as to be mostly overlapped the gate wiring 13. The lower layer side gate wiring 17 extends in parallel with the gate wiring 13 along the X axis direction, and is connected to the gate wiring 13 to reduce wiring resistance and achieve redundancy. The source wirings 13 are arranged in the same number as the number of the pixel electrodes 12 arranged in the X axis direction so as to be alternately and repeatedly arranged with the pixel electrodes 12 in the X axis direction. The line widths of the gate wiring 13, the source wiring 14, and the lower layer side gate wiring 17 are changed in accordance with the positions of each wiring in the extending direction. The first transistor 11 is driven based on the scanning signal transmitted to the gate wiring 13 and the lower layer side gate wiring 17, and accordingly the image signal (data signal) transmitted to the source wiring 14 can be supplied to the pixel electrode 12 to charge the pixel electrode 12 to a potential based on the image signal.

As illustrated in FIG. 2, the pixel electrode 12 is disposed in a vertically long rectangular region when viewed in plan. The pixel electrode 12 is formed of a stem electrode portion 12A and a plurality of branch electrode portions 12B continuous with the stem electrode portion 12A, and has a fishbone shape when viewed in plan as a whole. The stem electrode portion 12A has a cross shape when viewed in plan, and includes a portion extending along the X axis direction and a portion extending along the Y axis direction. A plurality of branch electrode portions 12B are disposed in each of the four regions partitioned by the cross-shaped stem electrode portion 12A, are continuous with the stem electrode portion 12A at one end side, and extend in a manner to spread substantially radially from the center of the stem electrode portion 12A. Therefore, the plurality of branch electrode portions 12B disposed in the regions adjacent to each other in the X axis direction and the Y axis direction have a relationship in which their extending directions intersect with each other. The plurality of branch electrode portions 12B are disposed side by side at substantially equal intervals in each of the above four regions, and a slit 12S having a substantially constant width is provided between adjacent branch electrode portions 12B. The extending direction of the slit 12S coincides with the extending direction of the branch electrode portion 12B, and the slit 12S extends in a manner to spread substantially radially from the center of the stem electrode portion 12A in each of the above four regions. As described above, it can be said that the pixel electrode 12 is divided into four domains 12D in which the extending directions of the slits 12S are different from each other. In the pixel electrode 12, two domains 12D are arranged side by side in each of the X axis direction and the Y axis direction. It can be said that the stem electrode portion 12A in the pixel electrode 12 is a boundary portion of the four domains 12D. Each of these four domains 12D has a vertically long rectangular shape when viewed in plan. Here, on the surface of the array substrate 10A, a partially recessed portion (absent portion of the pixel electrode 12) is formed at a portion overlapping the above-described slit 12S, and an electric field corresponding to the recessed shape is formed. Therefore, the liquid crystal molecules included in the liquid crystal layer 10C are aligned along the recessed portion. Therefore, the liquid crystal panel 10 according to the present embodiment is in the multi-domain vertical alignment (MVA) mode in which the alignment of the liquid crystal molecules included in the liquid crystal layer 10C is different for each domain 12D of the pixel electrode 12, so that the wide viewing angle is achieved. The CF substrate 10B has a substantially lattice-shaped black matrix (inter-pixel light shielding portion) 15 in which each of the portions overlapping the pixel electrodes 12 is opened. The black matrix 15 is disposed so as to overlap the first transistor 11, the gate wiring 13, the source wiring 14, and the like. The CF substrate 10B has a spacer 16 for holding the thickness (cell gap) of the liquid crystal layer 10C. As will be described later in detail, the spacer 16 is disposed in a plane so as to overlap a portion of the gate wiring 13.

Figure 3:
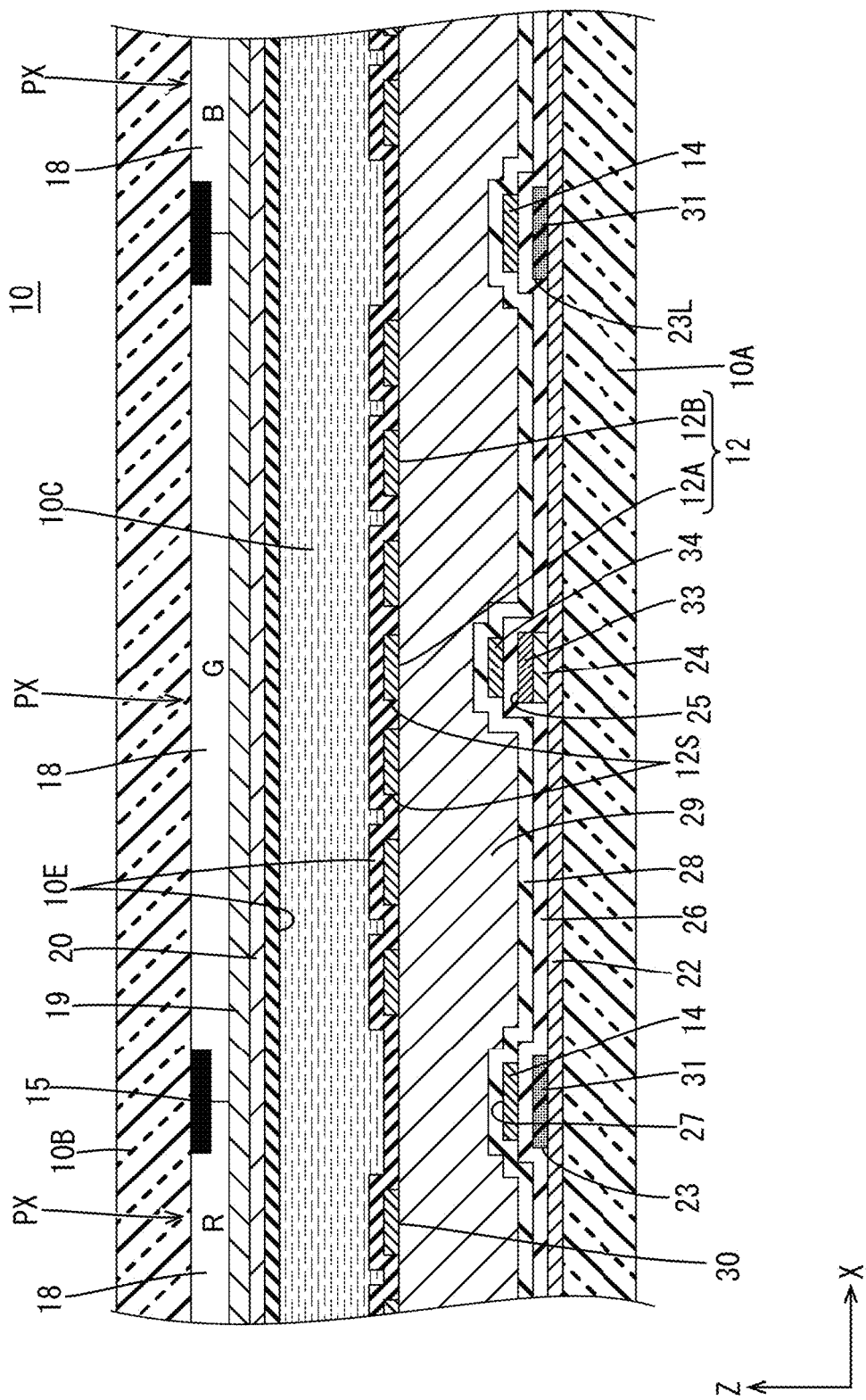
FIG. 3 is a cross-sectional view of the liquid crystal panel taken along the line A-A of FIG. 2.

FIG. 3 is a cross-sectional view of the liquid crystal panel 10 taken along the line A-A of FIG. 2. In the display region of the CF substrate 10B, as illustrated in FIG. 3, a large number of color filters 18 are provided side by side in a matrix at positions facing each of the pixel electrodes 12 on the array substrate 10A side. The color filters 18 having three colors of R (red), G (green), and B (blue) are repeatedly arranged in a predetermined order, and constitute a pixel portion PX which is a display unit together with the facing pixel electrode 12. In the present embodiment, the array pitch in the X axis direction in the pixel portion PX is, for example, approximately 67 µm, and the array pitch in the Y axis direction is, for example, approximately 201 µm. The above-described black matrix 15 is disposed between the adjacent color filters 18, so that color mixture or the like is prevented. An overcoat film 19 is formed on the inner surface side of the color filter 18 for flattening. A counter electrode 20 is formed on the inner surface side of the overcoat film 19. The counter electrode 20 is provided in a solid shape at least in the display region and faces all the pixel electrodes 12 with the liquid crystal layer 10C interposed therebetween. By supplying the reference potential (common potential) to the counter electrode 20, a potential difference is generated between the counter electrode 20 and the pixel electrode 12 charged by the first transistor 11. The alignment state of the liquid crystal molecules of the liquid crystal layer 10C is changed based on this potential difference, so that a predetermined gradation display can be performed for each pixel portion PX. The spacer 16 described above is formed on the inner surface side of the counter electrode 20 (refer to FIG. 2). Each of the alignment films 10E for aligning the liquid crystal molecules contained in the liquid crystal layer 10C is formed on the innermost surfaces of both substrates 10A and 10B that are in contact with the liquid crystal layer 10C. In the present embodiment, a vertical alignment film is used as the alignment film 10E.

Figure 4:
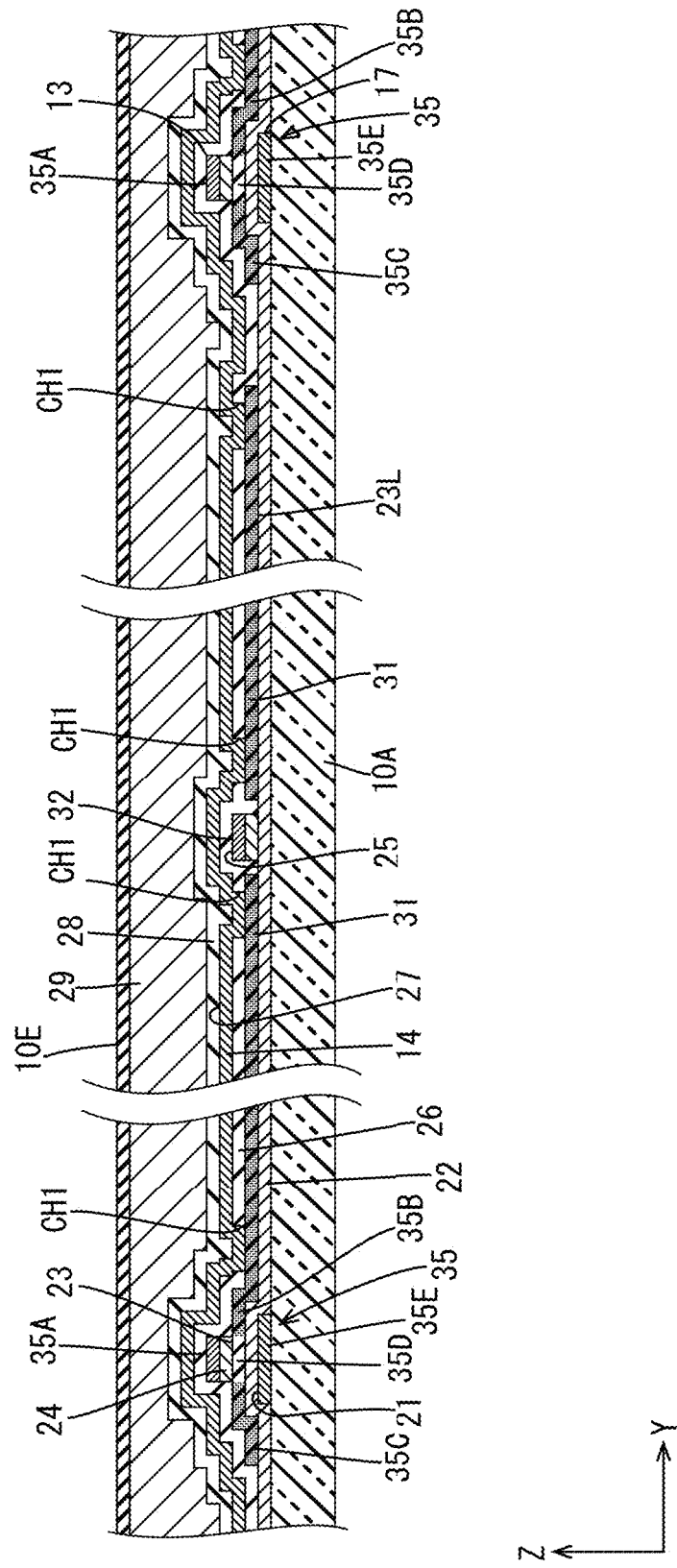
FIG. 4 is a cross-sectional view of the array substrate taken along the line B-B of FIG. 2.

Subsequently, each film laminated on the inner surface side of the array substrate 10A will be described in detail with reference to FIG. 4 in addition to FIG. 3. FIG. 4 is a cross-sectional view of the array substrate 10A taken along the line B-B of FIG. 2. As illustrated in FIGS. 3 and 4, the array substrate 10A includes a first metal film (lower layer side gate metal film) 21, a first insulating film (lower layer side gate insulating film, insulating film) 22 disposed on the upper layer side of the first metal film 21, a semiconductor film 23 disposed on the upper layer side of the first insulating film 22, a second insulating film (upper layer side gate insulating film, insulating film) 24 disposed on the upper layer side of the semiconductor film 23, a second metal film (gate metal film) 25 disposed on the upper layer side of the second insulating film 24, a third insulating film (insulating film) 26 disposed on the upper layer side of the second metal film 25, a third metal film (source metal film) 27 disposed on the upper layer side of the third insulating film 26, a fourth insulating film (insulating film) 28 disposed on the upper layer side of the third metal film 27, a fifth insulating film (insulating film) 29 disposed on the upper layer side of the fourth insulating film 28, a transparent electrode film 30 disposed on the upper layer side of the fifth insulating film 29, and an alignment film 10E disposed on the upper layer side of the transparent electrode film 30.

Each of the first metal film 21, the second metal film 25, and the third metal film 27 is a single layer film formed of one type of metal material, or a laminated film or alloy formed of different types of metal materials, and thus has conductivity and a light shielding property. As illustrated in FIG. 4, the first metal film 21 constitutes the lower layer side gate wiring 17 and the like. The second metal film 25 constitutes the gate wiring 13 and the like. The semiconductor film 23 is an oxide semiconductor film using, for example, an oxide semiconductor as a material. The semiconductor film 23 constitutes a first source electrode 11B, a first drain electrode 11C, a first channel region 11D, and the like that constitutes a first transistor 11 described later. Examples of a specific material of the semiconductor film 23 include In—Ga—Zn—O-based semiconductors (for example, indium gallium zinc oxide). Here, the In—Ga—Zn—O-based semiconductor is a ternary oxide of indium (In), gallium (Ga), and zinc (Zn), and the ratio (composition ratio) of In, Ga, and Zn is not particularly limited. For example, In:Ga:Zn=2:2:1, In:Ga:Zn=1:1:1, In:Ga:Zn=1:1:2 are included, and the ratio is not necessarily limited thereto. Although the In—Ga—Zn—O-based semiconductor may be amorphous or crystalline, in the case of crystalline, a crystalline In—Ga—Zn—O-based semiconductor in which the c-axis is aligned substantially perpendicular to the layer surface is preferable. Here, in the above semiconductor film 23, a portion not overlapping the second metal film 25 in the manufacturing process is selectively lowered in resistance, and the semiconductor film 23 includes a resistance lowering region 23L and a non-resistance region. In FIGS. 3, 4, 10, and 13, the resistance lowering region 23L of the semiconductor film 23 is illustrated in a mesh shape. The resistance lowering region 23L of the semiconductor film 23 has a significantly low resistivity, for example, approximately $1/10000000000$ to $1/100$, as compared with the resistance non-lowering region, and functions as a conductor. The resistance lowering region 23L of the semiconductor film 23 constitutes the first source electrode 11B and the first drain electrode 11C of the first transistor 11, and the like. In the resistance non-lowering region of the semiconductor film 23 allows the movement of charges only under a specific condition (case where a scanning signal is supplied to the gate wiring 13), whereas the resistance lowering region 23L normally allows the movement of charges and functions as a conductor. The resistance non-lowering region of the semiconductor film 23 constitutes the first channel region 11D of the first transistor 11. The transparent electrode film 30 is formed of a transparent electrode material such as indium tin oxide (ITO) or indium zinc oxide (IZO) and constitutes the pixel electrode 12 or the like.

The second insulating film 24 and the third insulating film 26 are both formed of silicon oxide ($SiO_2$, oxide silicon) or the like, which is a type of inorganic insulating material (inorganic resin material). The fourth insulating film 28 is formed of silicon nitride (SiNx), which is a type of inorganic insulating material. The first insulating film 22 is a laminated film of $SiO_2$ and SiNx. The fifth insulating film 29 is formed of acrylic resin (PMMA), which is a type of organic insulating material (organic material) having photosensitivity. The first insulating film 22 is interposed between the first metal film 21 and the semiconductor film 23 to insulate these films. The second insulating film 24 is interposed between the semiconductor film 23 and the second metal film 25 to insulate these films. The second insulating film 24 is patterned by using the second metal film 25 on the upper layer side as a mask when the array substrate 10A is manufactured, and is formed so as to selectively remain only in a range overlapping the second metal film 25. The first insulating film 22 and the second insulating film 24 are interposed between the lower layer side gate wiring 17 formed of the first metal film 21 and the gate wiring 13 formed of the second metal film to insulate these both wirings 13 and 17 from each other. The third insulating film 26 is interposed between the semiconductor film 23, the second metal film 25, and the third metal film 27 to insulate these films. In particular, the portion of the third insulating film 26 that is interposed between intersections of the gate wiring 13 formed of the second metal film 25 and the source wiring 14 formed of the third metal film 27 insulates both wirings 13 and 14 from each other. The fourth insulating film 28 is interposed between the third metal film 27 and the transparent electrode film 30 together with the fifth insulating film 29 to insulate these films. The fifth insulating film 29 has a thicker film thickness than those of the other insulating films 22, 24, 26, and 28 formed of an inorganic resin material, and functions to flatten the surface of the array substrate 10A.

Figure 5:
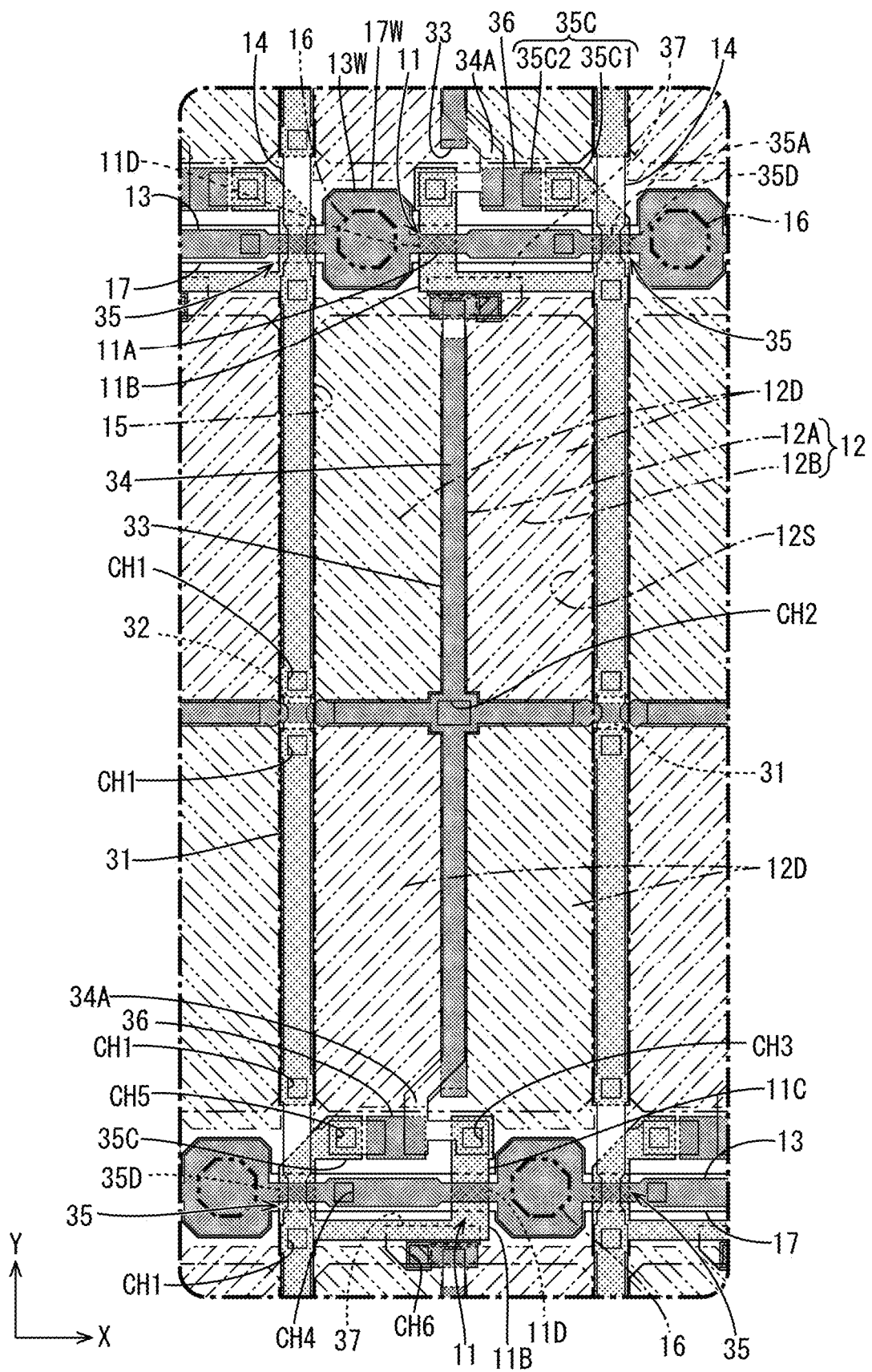
FIG. 5 is a plan view mainly illustrating patterns of a semiconductor film and a second metal film provided on the array substrate.

FIG. 5 is a plan view illustrating the semiconductor film 23 and the second metal film 25 in a mesh shape and the other metal films 21 and 27 in a hollow shape in the same plan view as FIG. 2. In the display region of the array substrate 10A, as illustrated in FIGS. 4 and 5, a resistance lowering source wiring 31 is disposed so as to overlap most of the source wiring 14. The resistance lowering source wiring 31 is formed of the resistance lowering region 23L of the semiconductor film 23, and the third insulating film 26 is interposed between the resistance lowering source wiring 31 and the overlapping source wiring 14. The resistance lowering source wiring 31 is connected to the source wiring 14 through a source wiring contact hole CH1 having an opening formed in the third insulating film 26. As a result, the wiring resistance in the source wiring 14 is reduced and redundancy is achieved.

Figure 6:
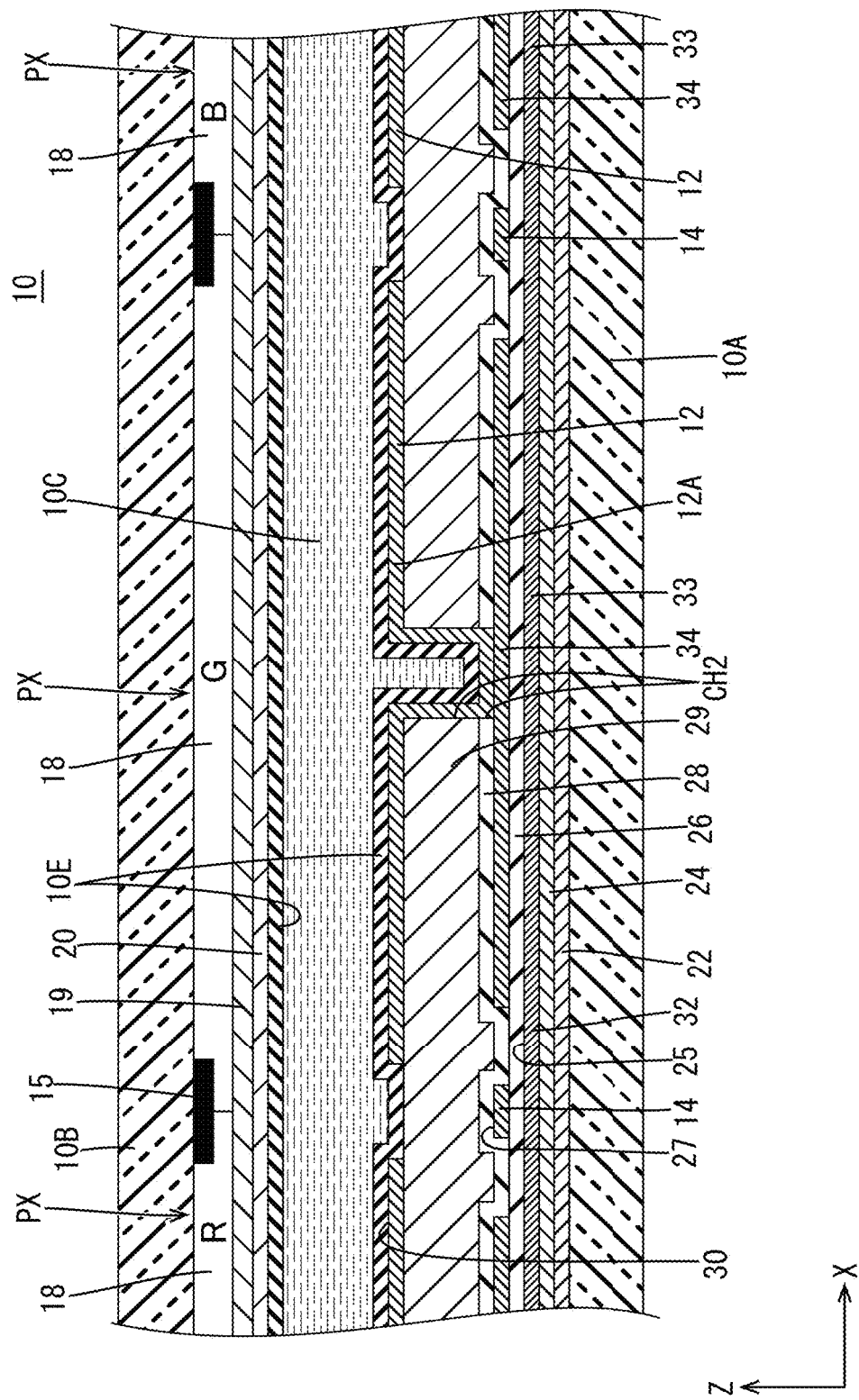
FIG. 6 is a cross-sectional view of the liquid crystal panel taken along the line C-C of FIG. 2.

FIG. 6 is a cross-sectional view of the liquid crystal panel 10 taken along the line C-C of FIG. 2. In the display region of the array substrate 10A, as illustrated in FIGS. 5 and 6, a capacitance wiring 32 is provided so as to cross the pixel electrode 12. The capacitance wiring 32 extends in parallel with the gate wiring 13 along the X axis direction, crosses the central portion of the pixel electrode 12 in the long side direction, and intersects the source wiring 14. The capacitance wiring 32 is formed of the same second metal film 25 as the gate wiring 13, and the third insulating film 26, the fourth insulating film 28, and the fifth insulating film 29 are interposed between the capacitance wiring 32 and the crossing pixel electrode 12, whereas the third insulating film 26 is interposed between the capacitance wiring 32 and the intersecting source wiring 14. Incidentally, since the above resistance lowering source wiring 31 includes the resistance lowering region 23L of the semiconductor film 23, the resistance lowering source wiring 31 intersects the source wiring 14 and is divided into a plurality of portions so as not to overlap the gate wiring 13 and the capacitance wiring 32 which are formed of the second metal film 25. The number of divisions of the resistance lowering source wiring 31 is approximately twice the number of the pixel electrodes 12 disposed in the Y axis direction. The resistance lowering source wiring 31 having such a divided structure is connected to the source wiring 14 at two positions with the capacitance wiring 32 interposed therebetween and at two positions with the gate wiring 13 interposed therebetween through the source wiring contact hole CH1.

As illustrated in FIGS. 5 and 6, a portion of the capacitance wiring 32 overlapping the pixel electrode 12 constitutes a capacitance forming portion 33 that forms an electrostatic capacitance between the portion of the capacitance wiring 32 and the pixel electrode 12. The capacitance forming portion 33 is formed of a portion having a portion of the capacitance wiring 32 and extending along the X axis direction and a portion extending along the Y axis direction, and has a cross shape when viewed in plan as a whole. The capacitance forming portion 33 is disposed so as to be selectively overlapped the stem electrode portion 12A forming the pixel electrode 12, that is, the boundary portion between the adjacent domains 12D. Here, in the pixel electrode 12, in the vicinity of the boundary portion between the plurality of domains 12D, since it is difficult for the liquid crystal molecules to be aligned in a desired direction, for example, in the direction along the slit 12S that is the absent portion of the pixel electrode 12, the amount of transmitted light tends to be locally reduced. On the other hand, when the capacitance forming portion 33 is disposed to selectively overlap the boundary portion between the adjacent domains 12D of the pixel electrode 12 as described above, a decrease in the amount of transmitted light that may occur due to the capacitance forming portion 33 formed of the second metal film 25 shielding light being disposed so as to overlap the pixel electrode 12 is suppressed. Therefore, the aperture ratio can be improved as compared with the case where the capacitance forming portion is disposed so as not to overlap the stem electrode portion 12A and so as to overlap the domain 12D.

Figure 7:
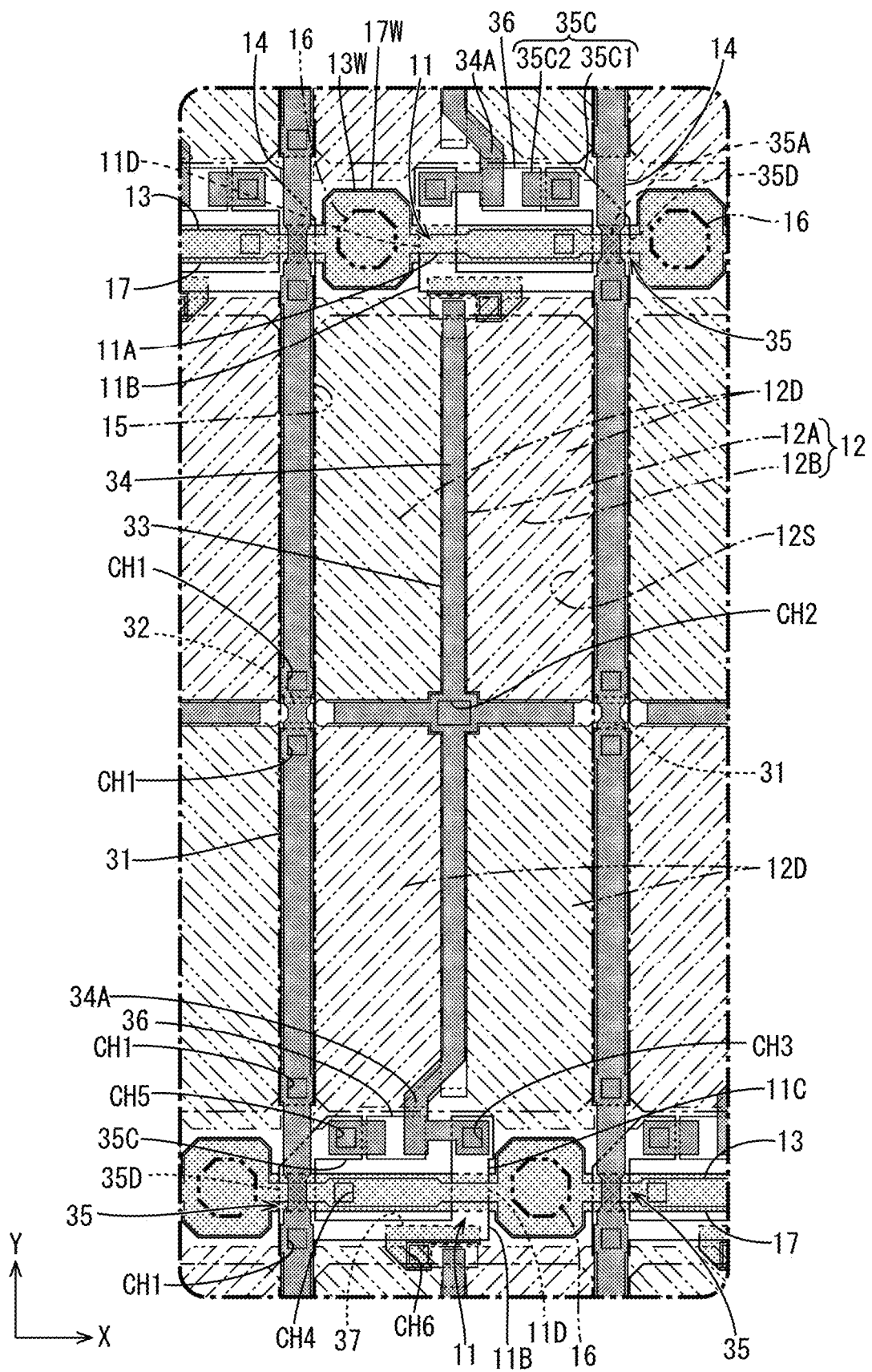
FIG. 7 is a plan view mainly illustrating patterns of a first metal film and a third metal film provided on the array substrate.

FIG. 7 is a view illustrating the first metal film and the third metal film 27 in a mesh shape and the semiconductor film 23 and the second metal film 25 in a hollow shape in the same plan view as FIG. 2. As illustrated in FIGS. 6 and 7, a pixel electrode connecting portion 34 connected to the pixel electrode 12 is provided in the display region of the array substrate 10A. The pixel electrode connecting portion 34 includes a portion extending along the X axis direction and a portion extending along the Y axis direction, and has a cross shape when viewed in plan as a whole. The pixel electrode connecting portion 34 is disposed so as to overlap the capacitance forming portion 33 and the stem electrode portion 12A of the pixel electrode 12. The pixel electrode connecting portion 34 is formed of the same third metal film 27 as the source wiring 14. The fourth insulating film 28 and the fifth insulating film 29 are interposed between the pixel electrode connecting portion 34 and the overlapping stem electrode portion 12A, whereas the third insulating film 26 is interposed between the pixel electrode connecting portion 34 and the overlapping capacitance forming portion 33. The pixel electrode connecting portion 34 is connected to the stem electrode portion 12A of the pixel electrode 12 through the pixel electrode contact hole CH2 having an opening formed in the fourth insulating film 28 and the fifth insulating film 29. The pixel electrode contact hole CH2 is disposed at a central position (intersection position between a portion extending along the X axis direction and a portion extending along the Y axis direction) in the pixel electrode connecting portion 34 and the stem electrode portion 12A. The pixel electrode connecting portion 34 is connected to the pixel electrode 12 through the pixel electrode contact hole CH2, and thus has the same potential as the pixel electrode 12. The pixel electrode connecting portion 34 is disposed on the lower layer side of the pixel electrode 12, that is, near the capacitance forming portion 33. Therefore, in a case where the pixel electrode connecting portion is not formed, compared with the electrostatic capacitance formed between the capacitance forming portion and the pixel electrode, the electrostatic capacitance formed between the capacitance forming portion 33 and the pixel electrode connecting portion 34 is larger. As a result, it is preferable for improving the voltage holding ratio of the charged pixel electrode 12.

Figure 8:
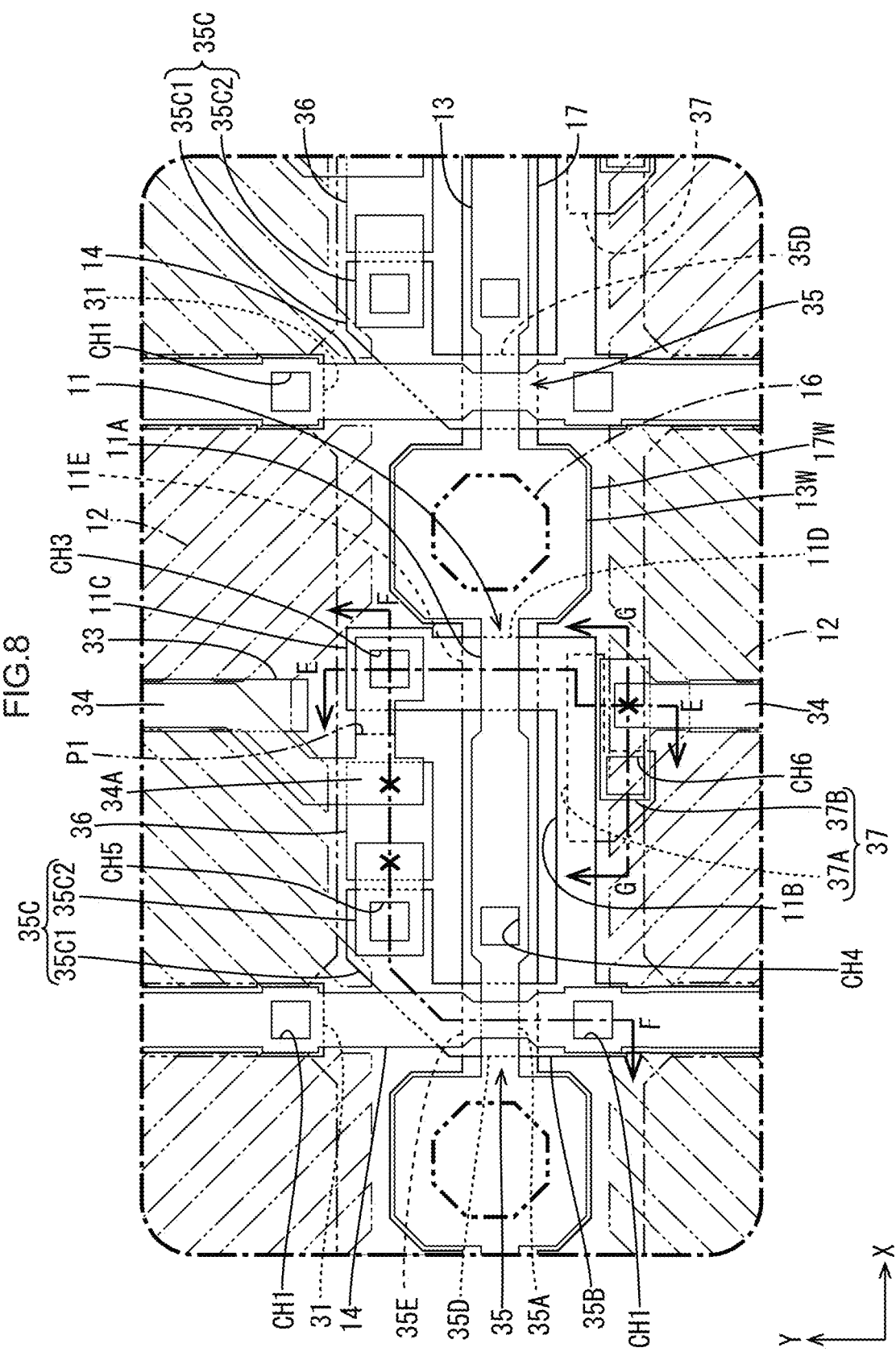
FIG. 8 is an enlarged plan view of the vicinity of a first transistor and a second transistor on the array substrate.
Figure 9:
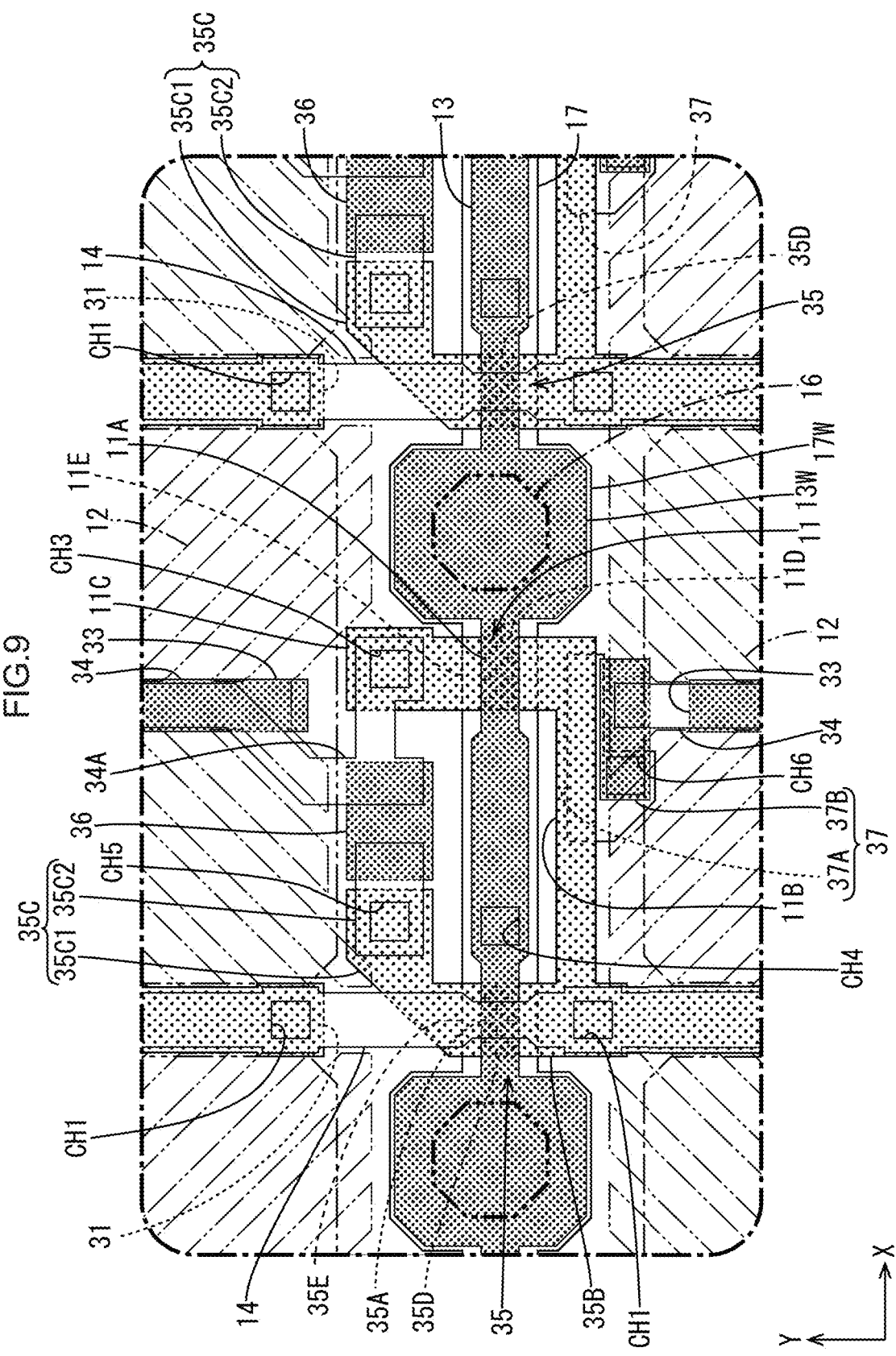
FIG. 9 is an enlarged plan view of the vicinity of the first transistor and the second transistor mainly illustrating the patterns of the semiconductor film and the second metal film provided on the array substrate.

The configuration of the first transistor 11 will be described in detail with reference to FIGS. 8 to 10 in addition to FIG. 2. FIG. 8 is a plan view of the vicinity of the first transistor 11 on the array substrate 10A. FIG. 9 is a view illustrating the semiconductor film 23 and the second metal film 25 in a mesh shape and the first metal film 21 and the third metal film 27 in a hollow shape in the same plan view as FIG. 8. As illustrated in FIG. 2, the first transistor 11 is disposed adjacent to the pixel electrode 12 that is the connection target on the lower side in FIG. 2 in the Y axis direction. A plurality of the first transistors 11 are arranged in a zigzag pattern so that a transistor connected to the pixel electrode 12 on the left side illustrated in FIG. 2 of the source wiring 14 that is the connection target and a transistor connected to the pixel electrode 12 on the right side are arranged alternately and repeatedly in the Y axis direction. As illustrated in FIGS. 8 and 9, the first transistor 11 has a first gate electrode (upper layer side first gate electrode) 11A including a portion of the gate wiring 13. The first gate electrode 11A includes a portion of the gate wiring 13 that does not overlap the source wiring 14. Specifically, the first gate electrode 11A is disposed at a position at an interval in the X axis direction from the source wiring 14 that is the connection target of the first transistor 11, and the distance is larger than half the short side dimension of the pixel electrode 12. That is, the first gate electrode 11A is disposed such that the source wiring 14 on the opposite side with the pixel electrode 12 interposed between the first gate electrode 11A and the source wiring 14 is closer than the source wiring 14 that is the connection target of the first transistor 11. A portion of the gate wiring 13 that constitutes the first gate electrode 11A is a narrow portion having the smallest line width. The first gate electrode 11A has a horizontally long rectangular shape when viewed in plan.

Figure 10:
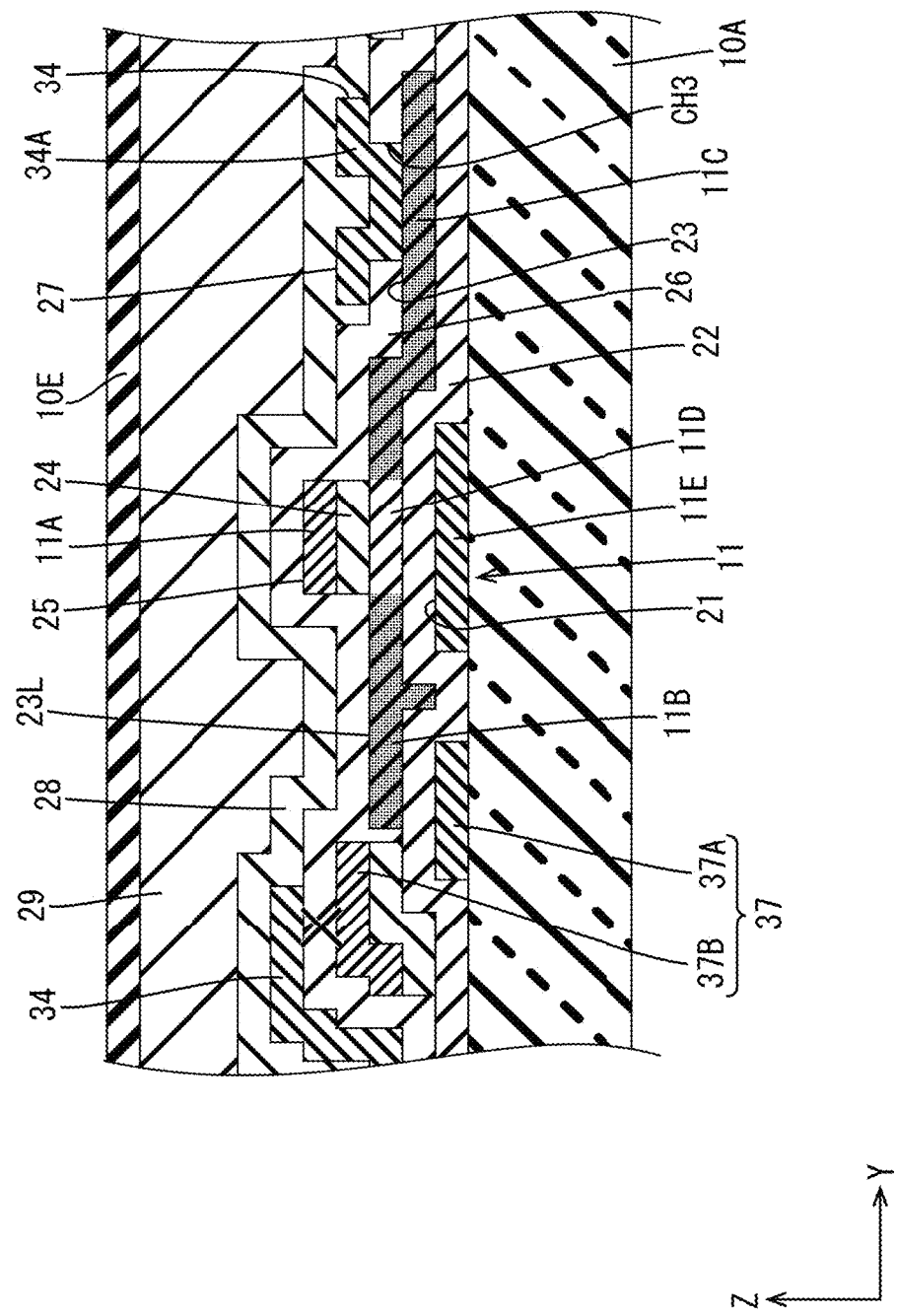
FIG. 10 is a cross-sectional view of the array substrate taken along the line E-E of FIG. 8.

FIG. 10 is a cross-sectional view of the array substrate 10A taken along the line E-E of FIG. 8. As illustrated in FIGS. 8 and 9, the first transistor 11 has a first source electrode 11B connected to the source wiring 14. The first source electrode 11B is connected to the source wiring 14 at a position interposing the gate wiring 13 that is the connection target in the Y axis direction with respect to the pixel electrode 12 that is the connection target of the first transistor 11. The first source electrode 11B is formed of the resistance lowering region 23L of the semiconductor film 23, and is directly continuous with the resistance lowering source wiring 31. The first source electrode 11B has a substantially L shape when viewed in plan, protrudes from the source wiring 14 that is the connection target along the X axis direction, is bent, and extends along the Y axis direction. The first transistor 11 has a first drain electrode 11C disposed at an interval from the first source electrode 11B in the Y axis direction. The first drain electrode 11C extends along the Y axis direction, and an end portion on the side opposite to the first source electrode 11B (first channel region 11D) side is connected to the pixel electrode 12 via the pixel electrode connecting portion 34. The first drain electrode 11C includes the resistance lowering region 23L of the semiconductor film 23, similarly to the first source electrode 11B. As illustrated in FIG. 10, the first drain electrode 11C is connected to the pixel electrode connecting portion 34 formed of the third metal film 27 through a first transistor contact hole CH3 having an opening formed in the third insulating film 26 interposed therebetween. In the pixel electrode connecting portion 34, as illustrated in FIG. 8, an end portion on the first transistor 11 side (lower side illustrated in FIG. 8) of the portion extending along the Y axis direction is bent and extended to a position overlapping both the first drain electrode 11C and the first transistor contact hole CH3. Specifically, an extension portion 34A of the pixel electrode connecting portion 34 is once bent obliquely toward a side opposite to the first drain electrode 11C side (left side illustrated in FIG. 8) that is the connection target in the X axis direction, and then bent again to extend toward the first drain electrode 11C side (right side illustrated in FIG. 8) that is the connection target in the X axis direction. The extended end portion thereof is disposed so as to overlap the first drain electrode 11C and the first transistor contact hole CH3.

Figure 11:
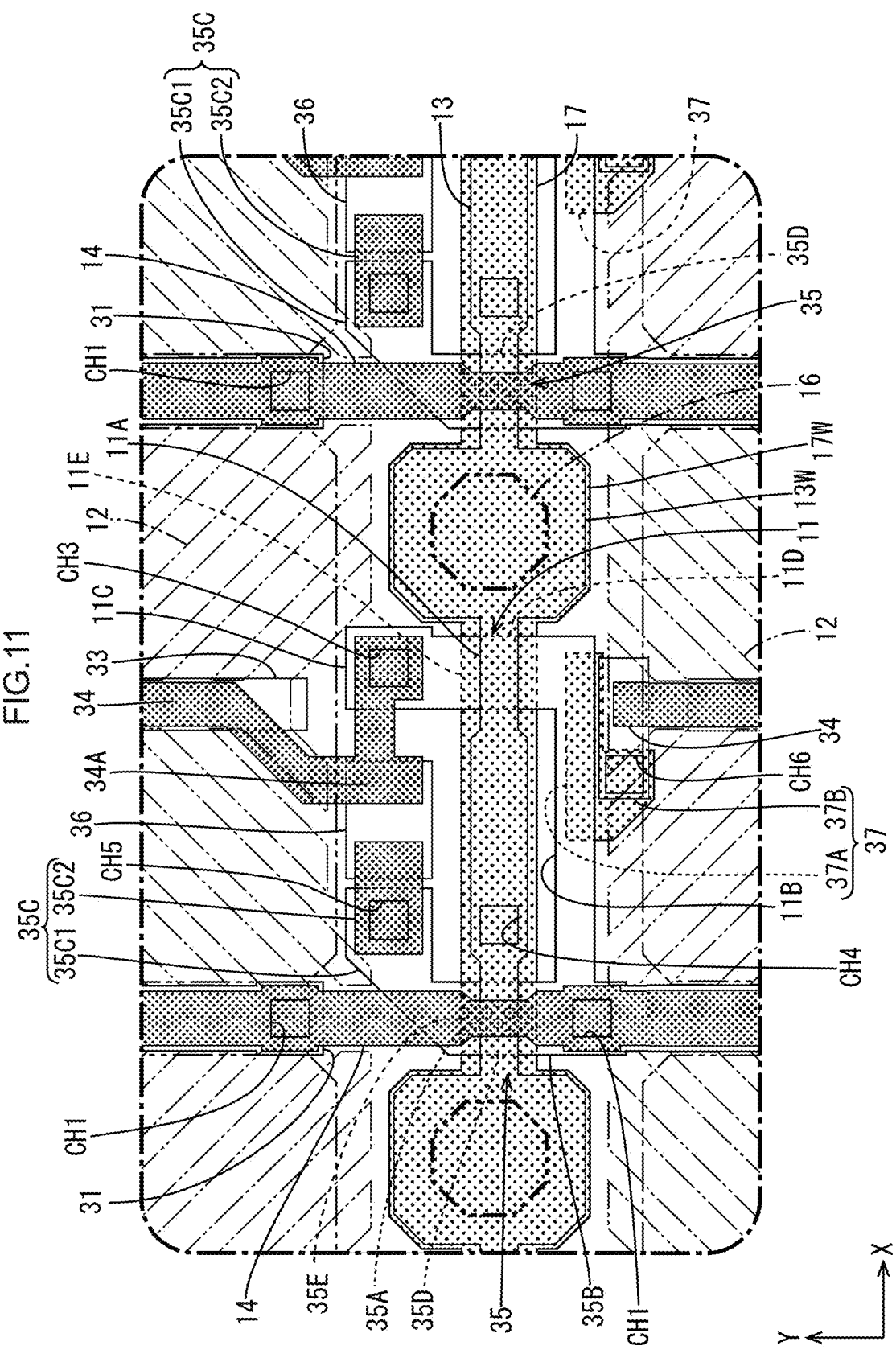
FIG. 11 is an enlarged plan view of the vicinity of the first transistor and the second transistor mainly illustrating the patterns of the first metal film and the third metal film provided on the array substrate.
Figure 12:
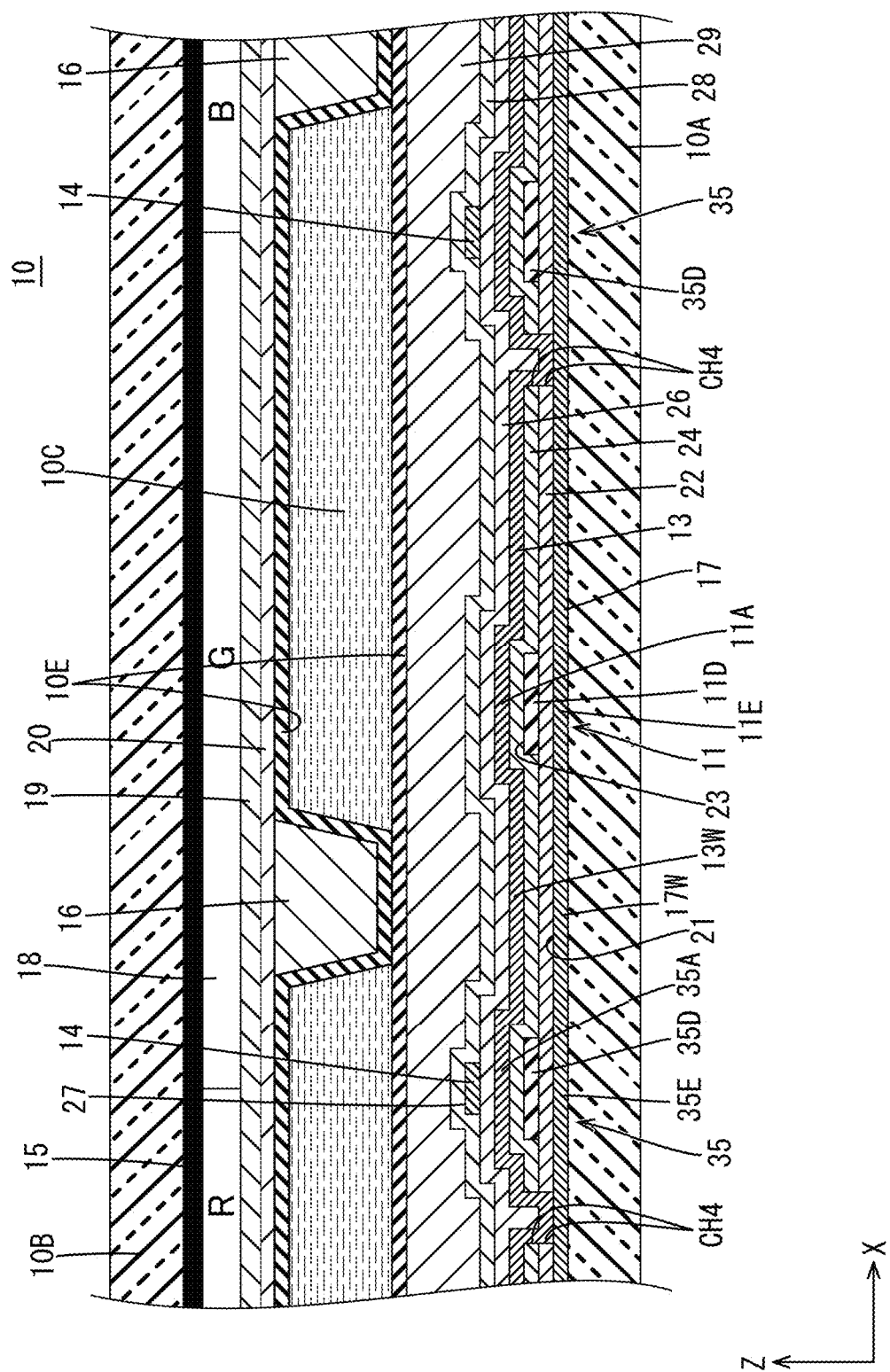
FIG. 12 is a cross-sectional view of the liquid crystal panel taken along the line D-D of FIG. 2.

FIG. 11 is a view illustrating the first metal film 21 and the third metal film 27 in a mesh shape and the semiconductor film 23 and the second metal film 25 in a hollow shape in the same plan view as FIG. 8. FIG. 12 is a cross-sectional view of the array substrate 10A taken along the line D-D of FIG. 2. As illustrated in FIGS. 8 and 9, the first transistor 11 is disposed so as to overlap the lower layer side of the first gate electrode 11A, and has the first channel region 11D continuous with the first source electrode 11B and the first drain electrode 11C. The first channel region 11D extends along the Y axis direction, and one end side portion thereof is continuous with the first source electrode 11B and the other end side portion thereof is continuous with the first drain electrode 11C, respectively. The first channel region 11D includes a resistance non-lowering region of the semiconductor film 23. Furthermore, as illustrated in FIGS. 10 and 11, the first transistor 11 has a lower layer side first gate electrode 11E disposed so as to overlap the first channel region 11D on the lower layer side. The lower layer side first gate electrode 11E includes a portion of the lower layer side gate wiring 17. The lower layer side first gate electrode 11E has a horizontally long rectangular shape when viewed in plan, similarly to the first gate electrode 11A and the first channel region 11D, and the width dimension thereof is larger than the width dimension of the first gate electrode 11A. That is, the portion of the lower layer side gate wiring 17 that constitutes the lower layer side first gate electrode 11E is wider than a narrow portion of the gate wiring 13. As illustrated in FIG. 12, the lower layer side gate wiring 17 having the lower layer side first gate electrode 11E is connected to the gate wiring 13 having the first gate electrode 11A through an inter-gate wiring contact hole CH4 having openings formed in the first insulating film 22 and the second insulating film 24 interposed therebetween. The inter-gate wiring contact hole CH4 is disposed near the source wiring 14 in the region between the source wiring 14 that is the connection target of the first transistor 11 and the first gate electrode 11A in the X axis direction. As described above, the first channel region 11D is configured to be interposed by the first gate electrode 11A and the lower layer side first gate electrode 11E from the upper layer side and the lower layer side in the Z axis direction. Therefore, the drain current flowing in the first channel region 11D can be increased as compared with the case where only one gate electrode is disposed so as to overlap the first channel region 11D. As a result, the pixel electrode 12 can be sufficiently charged even when the charging time of the pixel electrode 12 is shortened due to higher definition and the like.

In the display region of the array substrate 10A according to the present embodiment, as illustrated in FIG. 2, a second transistor (spare transistor) 35 for backup is provided in addition to the first transistor 11. This second transistor 35 is normally not connected to the pixel electrode 12, and in a case where a defect occurs in the first transistor 11, the first transistor 11 can be electrically disconnected from the pixel electrode 12, and the second transistor 35 can be connected to the pixel electrode 12. The pixel electrode 12 connected to the second transistor 35 is charged by the second transistor 35. The second transistor 35 will be described in detail below.

As illustrated in FIG. 2, the second transistor 35 is disposed so as to be adjacent to the pixel electrode 12 that is the connection target on the lower side illustrated in FIG. 2 in the Y axis direction, similar to the first transistor 11. A plurality of the second transistors 35 are arranged in a zigzag pattern so that a transistor connected to the pixel electrode 12 on the left side illustrated in FIG. 2 with respect to the source wiring 14 that is the connection target and a transistor connected to the pixel electrode 12 on the right side are arranged alternately and repeatedly in the Y axis direction. As illustrated in FIGS. 8 and 9, the second transistor 35 has a second gate electrode (upper layer side second gate electrode) 35A including a portion of the gate wiring 13. The portion of the gate wiring 13 that constitutes the second gate electrode 35A is a narrow portion having the smallest line width, and the width dimension and area thereof are significantly the same as those of the first gate electrode 11A.

As illustrated in FIGS. 8 and 9, the second gate electrode 35A includes a portion of the gate wiring 13 that intersects (overlaps) the source wiring 14. Specifically, the second gate electrode 35A is disposed at a position overlapping the source wiring 14 that is the connection target of the second transistor 35. Therefore, the second gate electrode 35A is disposed closest to the source wiring 14 that is the connection target of the second transistor 35 in the structure (first gate electrode 11A, the inter-gate wiring contact hole CH4, and the like) disposed so as to overlap the gate wiring 13. On the other hand, the first gate electrode 11A includes the portion of the gate wiring 13 that does not overlap the source wiring 14 as described above. Therefore, as compared with the case in the related art where a first thin film transistor and a second thin film transistor are disposed between the two signal lines interposing the pixel electrode 12, the number of structures that occupy a portion of the gate wiring 13 that does not overlap the source wiring 14 is small, and the degree of freedom in design near the portion is improved. As a result, many structures other than transistors can be installed near the portion of the gate wiring 13 that does not overlap the source wiring 14, and in the present embodiment, for example, the inter-gate wiring contact hole CH4 is installed. Furthermore, in the present embodiment, the portion of the gate wiring 13 adjacent to the first gate electrode 11A on the side opposite to the second gate electrode 35A side in the X axis direction is a widened portion 13W having the widest line width, as illustrated in FIG. 9. Similarly, the portion of the lower layer side gate wiring 17 adjacent to the lower layer side first gate electrode 11E on the side opposite to the lower layer side second gate electrode 35E side in the X axis direction is a widened portion 17W having the widest line width. Wiring resistance in the gate wiring 13 is reduced by these widened portions 13W and 17W. Specifically, these widened portions 13W and 17W are disposed so as to be interposed between the first gate electrode 11A, the lower layer side first gate electrode 11E, and the source wiring 14 interposing the pixel electrode 12 that is the same connection target of the source wiring 14 that is the connection target of the first transistor 11 including the first gate electrode 11A and the lower layer side first gate electrode 11E. As illustrated in FIG. 12, the spacer 16 is disposed so as to overlap these widened portions 13W and 17W. The spacer 16 protrudes from the inner surface of the CF substrate 10B toward the array substrate 10A so as to penetrate the liquid crystal layer 10C along the Z axis direction, and is in contact with the innermost surface of the array substrate 10A so as to overlap the widened portions 13W and 17W, so that the thickness (cell gap) of the liquid crystal layer 10C is kept constant. Since the flatness of the innermost surface of the array substrate 10A is ensured by these widened portions 13W and 17W, the contact area of the spacer 16 is sufficiently ensured, so that it is unlikely for the spacer 16 to occur a defect such as displacement. As described above, it is possible to install the inter-gate wiring contact hole CH4 and the widened portions 13W and 17W by utilizing the increase in the degree of freedom in design in the portion of the gate wiring 13 that does not overlap the source wiring 14.

As illustrated in FIGS. 8 and 9, the second transistor 35 has a second source electrode 35B connected to the source wiring 14. The second source electrode 35B is connected to the source wiring 14 at a position interposing the gate wiring 13 that is the same connection target in the Y axis direction with respect to the pixel electrode 12 that is the connection target of the second transistor 35. The second source electrode 35B is formed of the resistance lowering region 23L of the semiconductor film 23 and is directly continuous with the resistance lowering source wiring 31. The second source electrode 35B extends along the Y axis direction in parallel with the resistance lowering source wiring 31, and the entire area thereof is disposed so as to overlap the source wiring 14 that is the connection target.

Figure 13:
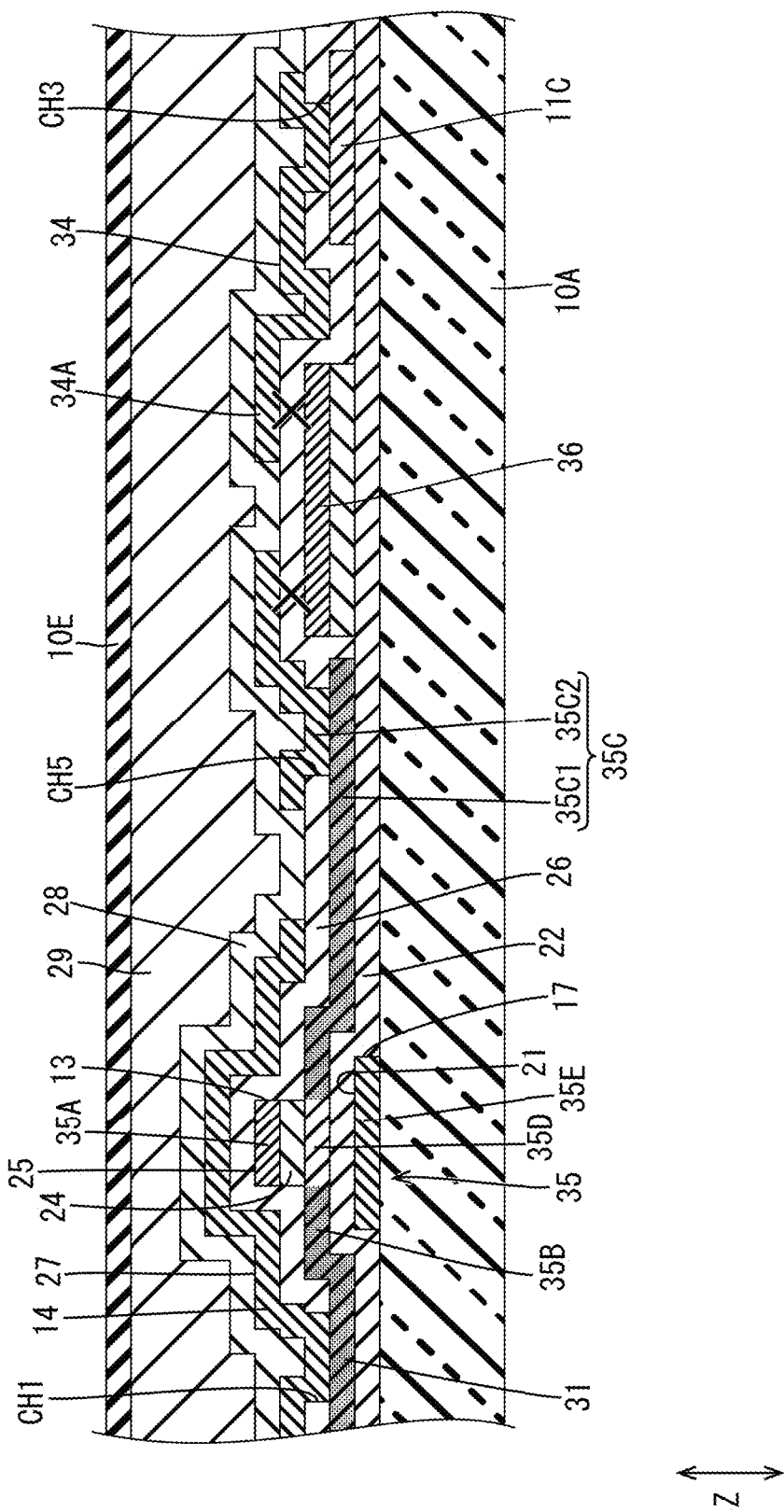
FIG. 13 is a cross-sectional view of the array substrate taken along the line F-F of FIG. 8.

FIG. 13 is a cross-sectional view of the array substrate 10A taken along the line F-F of FIG. 8. As illustrated in FIGS. 9 and 11, the second transistor 35 has a second drain electrode 35C disposed at an interval from the second source electrode 35B in the Y axis direction. The second drain electrode 35C is normally separated from the pixel electrode 12. Therefore, even when the second transistor 35 is driven based on the signal transmitted to the gate wiring 13 in the state where the second drain electrode 35C is separated from the pixel electrode 12, the pixel electrode 12 is not charged by the second transistor 35. The second drain electrode 35C includes a resistance lowering portion 35C1 formed of the resistance lowering region 23L of the same semiconductor film 23 as the second source electrode 35B, and a source metal portion 35C2 formed of the same third metal film 27 as the source wiring 14. The resistance lowering portion 35C1 has a substantially L-shaped bent shape when viewed in plan, and one end side portion thereof is disposed so as to overlap the source wiring 14 and face the second source electrode 35B. On the other hand, the other end side portion is disposed so as to protrude toward the pixel electrode connecting portion 34 side so as not to overlap the source wiring 14. The source metal portion 35C2 has a horizontally long rectangular shape when viewed in plan, and one end side portion thereof is disposed so as to overlap the other end side portion of the resistance lowering portion 35C1. As illustrated in FIG. 13, the source metal portion 35C2 is connected to the overlapping resistance lowering portion 35C1 through a second transistor contact hole CH5 having an opening formed in the third insulating film 26 interposed therebetween. The source metal portion 35C2 is disposed such that the other end side portion thereof, that is, the portion on the pixel electrode connecting portion 34 side does not overlap the resistance lowering portion 35C1.

As illustrated in FIGS. 8 and 9, the second transistor 35 is disposed so as to overlap the second gate electrode 35A on the lower layer side and has a second channel region 35D continuous with the second source electrode 35B and the second drain electrode 35C. The second channel region 35D extends along the Y axis direction, and one end side portion thereof is continuous with the second source electrode 35B, and the other end side portion is continuous with one end side portion of the resistance lowering portion 35C1 of the second drain electrode 35C, respectively. The second channel region 35D includes a resistance non-lowering region of the semiconductor film 23. As illustrated in FIGS. 10 and 11, the second transistor 35 has a lower layer side second gate electrode 35E disposed so as to overlap the second channel region 35D on the lower layer side. The lower layer side second gate electrode 35E includes a portion of the lower layer side gate wiring 17. Similarly to the second gate electrode 35A and the second channel region 35D, the lower layer side second gate electrode 35E has a horizontally long rectangular shape when viewed in plan, and the width dimension is larger than the width dimension of the second gate electrode 35A and is substantially the same as the width dimension of the lower layer side first gate electrode 11E. Since the second channel region 35D is interposed by the lower layer side second gate electrode 35E and the second gate electrode 35A from the upper layer side and the lower layer side in the Z axis direction, as compared with the case where only one gate electrode is disposed so as to overlap the second channel region 35D, the drain current flowing in the second channel region 35D can be increased. As described above, the second transistor 35 has the same transistor characteristics as the first transistor 11 described above.

In the display region of the array substrate 10A according to the present embodiment, as illustrated in FIGS. 2 and 8, a connectable portion 36 that can be connected to the second drain electrode 35C of the second transistor 35 and the pixel electrode 12 is provided. The connectable portion 36 is unevenly distributed in the X axis direction in the pixel portion PX so as to overlap the second drain electrode 35C that is the connection target. Therefore, similarly to the second transistor 35, the connectable portions 36 are disposed in a zigzag pattern so that the pixel portions PX adjacent to each other in the Y axis direction are alternately unevenly distributed on one side and the other side in the X axis direction. The connectable portion 36 is disposed so as to overlap both the source metal portion 35C2 forming the second drain electrode 35C and the extension portion 34A of the pixel electrode connecting portion 34 connected to the pixel electrode 12. The source metal portion 35C2 and the pixel electrode connecting portion 34, which overlap the connectable portion 36, are both formed of the third metal film 27. On the other hand, the connectable portion 36 is formed of the same second metal film 25 as the gate wiring 13 and the like, as illustrated in FIG. 11. Therefore, the third insulating film 26 is interposed between the connectable portion 36 formed of the second metal film 25, the source metal portion 35C2 formed of the third metal film 27, and the extension portion 34A of the pixel electrode connecting portion 34. The distance in the Z axis direction between the connectable portion 36 and the source metal portion 35C2, and the distance in the Z axis direction between the connectable portion 36 and the extension portion 34A of the pixel electrode connecting portion 34 are substantially the same as each other.

In a case where a defect occurs in the first transistor 11, the first drain electrode 11C of the first transistor 11 is separated from the pixel electrode 12, and the second drain electrode 35C of the second transistor 35 and the pixel electrode 12 can be connected to the connectable portion 36. Specifically, for example, in a case where a disconnection occurs in the portion of the gate wiring 13 that overlaps the first channel region 11D of the first transistor 11, that is, in the first gate electrode 11A, a portion of the first channel region 11D formed of the semiconductor film 23 has a lowered resistance (conductivity). In that case, the first transistor 11 has a defect in which the first source electrode 11B and the first drain electrode 11C are normally energized. Such a disconnection defect cannot be detected by the continuity inspection of the gate wiring 13 because the gate wiring 13 is made redundant by the lower layer side gate wiring 17, and can be detected by a lighting inspection in which an appropriate signal is supplied to the gate wiring 13 and the source wiring 14 after irradiating the liquid crystal panel 10 with light from the inspection backlight device. When the above disconnection defect is detected, as illustrated in FIG. 8, in the extension portion 34A of the pixel electrode connecting portion 34, the portion P1 closer to the connection position with the first drain electrode 11C (first transistor contact hole CH3) than an overlap portion with the connectable portion 36 is irradiated with a laser beam to cut the portion P1. As a result, the first drain electrode 11C of the first transistor 11 is electrically separated from the pixel electrode 12.

Subsequently, as illustrated in FIGS. 8 and 13, the overlap portion of the connectable portion 36 and the source metal portion 35C2 forming the second drain electrode 35C of the second transistor 35 is irradiated with the laser beam. As a result, the third insulating film 26 interposed between the overlap portions of the connectable portion 36 and the source metal portion 35C2 is destroyed, and the overlap portions are short-circuited. In FIGS. 8 and 13, the irradiation portions (short-circuited portions) of the laser beam on the connectable portion 36 are indicated by "x" marks. Similarly, when the overlap portion of the connectable portion 36 and the extension portion 34A of the pixel electrode connecting portion 34 is irradiated with the laser beam, the third insulating film 26 interposed between the overlap portions is destroyed, and the overlap portions are short-circuited. Here, since the connectable portion 36, the source metal portion 35C2, and the pixel electrode connecting portion 34, which are short-circuited by the irradiation with the laser beam, are all formed of the metal films 25 and 27, the connection reliability is increased. Moreover, since the same third insulating film 26 is interposed between the connectable portion 36, the source metal portion 35C2, and the pixel electrode connecting portion 34, it is not necessary to individually adjust the output and irradiation time when irradiating with the laser beam, the workability is good, and the connection reliability is further increased. As described above, the second drain electrode 35C is electrically connected to the pixel electrode connecting portion 34 via the connectable portion 36. By performing such repair work, when the signal is supplied to the gate wiring 13 and the signal is transmitted to the source wiring 14, the pixel electrode 12 is charged by the second transistor 35 instead of the first transistor 11. At this time, the signal transmitted to the source wiring 14 is supplied to the pixel electrode 12 via the second source electrode 35B, the second channel region 35D, the second drain electrode 35C, and the connectable portion 36.

By performing the repair work as described above, the pixel electrode 12 can be appropriately charged by using the second transistor 35 instead of the defective first transistor 11. On the other hand, since the second transistor 35 is disposed such that a portion of the second drain electrode 35C (resistance lowering portion 35C1) overlaps the source wiring 14, there is a concern that a parasitic capacitance may be generated between the source wiring 14 and the second drain electrode 35C (that is, between the source wiring 14 and the pixel electrode 12) and the load of the source wiring 14 may increase. When only the parasitic capacitance between the pixel electrode 12 and the source wiring 14 on one side of the pixel electrode 12 increases, there is a possibility that shadowing and display unevenness may be likely to be visually recognized.

Figure 14:
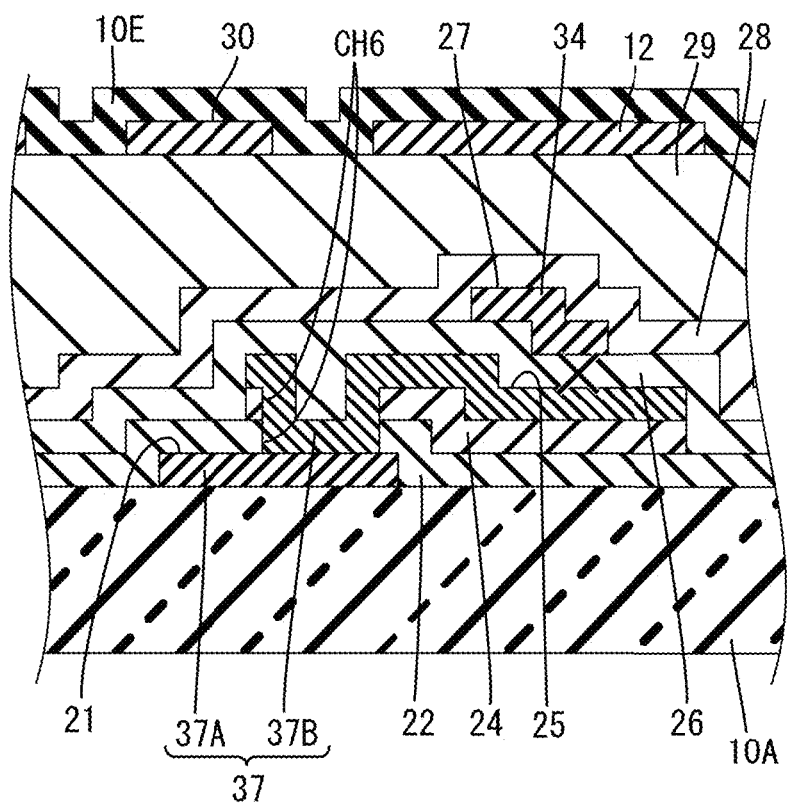
FIG. 14 is a cross-sectional view of the array substrate taken along the line G-G of FIG. 8.

FIG. 14 is a cross-sectional view of the array substrate 10A taken along the line G-G of FIG. 8. In view of the above problems, in the display region of the array substrate 10A according to the present embodiment, as illustrated in FIGS. 9 and 11, a second connectable portion 37 that is disposed so as to overlap the first source electrode 11B and is connectable to the pixel electrode 12 is provided. The second connectable portion 37 includes a first overlapping portion 37A disposed so as to overlap the first source electrode 11B and a second overlapping portion 37B disposed so as to overlap the pixel electrode connecting portion 34 connected to the pixel electrode 12. As illustrated in FIGS. 11 and 14, the first overlapping portion 37A is formed of the first metal film 21, has a horizontally long shape when viewed in plan, and one end side portion in the extending direction thereof is wider than the other end side portion. The first overlapping portion 37A overlaps the first source electrode 11B including the resistance lowering region 23L of the semiconductor film 23 over the entire length thereof via the first insulating film 22. A wide one end side portion of the first overlapping portion 37A overlaps the second overlapping portion 37B. As illustrated in FIGS. 9 and 14, the second overlapping portion 37B is formed of the second metal film 25 and has a horizontally long rectangular shape when viewed in plan. The second overlapping portion 37B is disposed such that one end side portion in the extending direction of itself overlaps the first overlapping portion 37A, whereas the other end side portion overlaps the pixel electrode connecting portion 34. One end side portion of the second overlapping portion 37B is connected to the first overlapping portion 37A through an inter-overlapping portion contact hole CH6 having openings formed in the first insulating film 22 and the second insulating film 24 interposed therebetween. The other end side portion of the second overlapping portion 37B is disposed so as to overlap the end portion on the side opposite to the extension portion 34A side (first transistor contact hole CH3 side) via the third insulating film 26, of the portion of the pixel electrode connecting portion 34 extending along the Y axis direction.

As illustrated in FIG. 8, in a case where the pixel electrode 12 is separated from the first transistor 11 and the repair work of connecting the second transistor 35 to the pixel electrode 12 using the connectable portion 36 is performed, by performing the repair work, the work of connecting the second connectable portion 37 to the pixel electrode 12 connected to the second transistor 35 is performed. Specifically, the overlap portion of the second overlapping portion 37B that constitutes the second connectable portion 37 which is the work target and the pixel electrode connecting portion 34 connected to the pixel electrode 12 is irradiated with the laser beam. As a result, the third insulating film 26 interposed between the overlap portions of the second overlapping portion 37B and the pixel electrode connecting portion 34 is destroyed, and the overlap portions are short-circuited. In FIGS. 8 and 14, the irradiation portions (short-circuited portions) of the laser beam on the second connectable portion 37 are indicated by "x" marks. As a result, the second connectable portion 37 has the same potential as the pixel electrode 12 described above, and an electrostatic capacitance is formed between the first overlapping portion 37A and the first source electrode 11B of the first transistor 11 overlapping with the first insulating film 22 interposed therebetween. Here, in the present embodiment, the first transistor 11 and the second transistor 35 are arranged in a zigzag pattern, and the pixel electrodes 12 charged based on the image signal transmitted to one source wiring 14 of the two source wirings 14 interposing the pixel electrode 12 and the pixel electrodes 12 charged based on the image signal transmitted to the other source wiring 14 are alternately disposed in the Y axis direction. Therefore, when the image signals of opposite polarities are supplied to the two source wirings 14 interposing the pixel electrode 12 at the same timing, the two pixel electrodes 12 adjacent to each other in the Y axis direction have potentials of polarities opposite to each other. In this manner, a parasitic capacitance is generated between the second drain electrode 35C connected to the second channel region 35D overlapping the one source wiring 14 and the one source wiring 14, and even when the potential of the pixel electrode 12 fluctuates in the positive direction, for example, the potential of the pixel electrode 12 can be fluctuated in the negative direction by the electrostatic capacitance generated between the second connectable portion 37 and the first source electrode 11B connected to the other source wiring 14. As a result, fluctuations in the potential of the pixel electrode 12 due to parasitic capacitance can be reduced, shadowing and display unevenness are unlikely to be visually recognized, and display quality is good.

As described above, the liquid crystal panel (display device) 10 of the present embodiment is provided with the gate wiring 13, the source wiring 14 extending so as to intersect the gate wiring 13, the pixel electrode 12 disposed adjacent to both the gate wiring 13 and the source wiring 14, the first transistor 11 that includes the first gate electrode 11A continuous with the gate wiring 13, the first source electrode 11B connected to the source wiring 14, the first drain electrode 11C connected to the pixel electrode 12, and the first channel region 11D connected to the first source electrode 11B and the first drain electrode 11C and disposed so as to overlap the first gate electrode 11A via the second insulating film 24 which is an insulating film, the first transistor 11 in which the first gate electrode 11A has a portion of the gate wiring 13 not overlapping the source wiring 14, the second transistor 35 that includes the second gate electrode 35A continuous with the gate wiring 13, the second source electrode 35B connected to the source wiring 14, the second drain electrode 35C separated from the pixel electrode 12, and the second channel region 35D connected to the second source electrode 35B and the second drain electrode 35C and disposed so as to overlap the second gate electrode 35A via the second insulating film 24 which is an insulating film, and the second transistor 35 in which the second gate electrode 35A has a portion of the gate wiring 13 intersecting the source wiring 14, and the connectable portion 36 connectable to the second drain electrode 35C and the pixel electrode 12.

In this manner, the first transistor 11 is driven by supplying the signal transmitted to the gate wiring 13 to the first gate electrode 11A. As a result, the signal transmitted to the source wiring 14 is supplied from the first source electrode 11B to the first drain electrode 11C via the first channel region 11D, and the pixel electrode 12 is charged based on the signal. In a case where a defect occurs in the first transistor 11, the second drain electrode 35C of the second transistor 35 and the pixel electrode 12 are connected to the connectable portion 36, and the first drain electrode 11C and the pixel electrode 12 are separated from each other. As a result, when the signal is supplied to the gate wiring 13 and transmitted to the source wiring 14, the pixel electrode 12 is charged by the second transistor 35 instead of the first transistor 11. At this time, the signal transmitted to the source wiring 14 is supplied to the pixel electrode 12 via the second source electrode 35B, the second channel region 35D, the second drain electrode 35C, and the connectable portion 36.

The first gate electrode 11A of the first transistor 11 includes a portion of the gate wiring 13 that does not overlap the source wiring 14, whereas the second gate electrode 35A of the second transistor 35 includes a portion of the gate wiring 13 that intersects the source wiring 14. Therefore, as compared with the case in the related art where a first thin film transistor and a second thin film transistor are disposed between the two signal lines interposing the pixel electrode 12, the degree of freedom in design near the portion of the gate wiring 13 that does not overlap the source wiring 14 is improved. As a result, a structure other than the transistor can be installed in the vicinity of a portion of the gate wiring 13 that does not overlap the source wiring 14.

The gate wiring 13 is formed of the second metal film 25 which is a gate metal film, whereas the source wiring 14 is formed of the third metal film 27 which is a source metal film disposed in a different layer from the second metal film 25 which is a gate metal film with the third insulating film 26 which is an insulating film interposed therebetween. In the first transistor 11 and the second transistor 35, the first channel region 11D and the second channel region 35D are formed of the semiconductor film 23 so as to be disposed in different layers from the second metal film 25 which is a gate metal film and the third metal film 27 which is a source metal film via the second insulating film 24 which is an insulating film, respectively. The second drain electrode 35C is the source metal portion 35C2 formed of the third metal film 27, at least a portion of which is a source metal film, whereas the pixel electrode 12 is connected to the pixel electrode connecting portion 34 formed of the third metal film 27 which is a source metal film. The connectable portion 36 is formed of the second metal film 25 which is a gate metal film, and is disposed so as to overlap the source metal portion 35C2 and the pixel electrode connecting portion 34 with the third insulating film 26 which is an insulating film interposed therebetween. With such a configuration, when the connectable portion 36 is connected to the second drain electrode 35C and the pixel electrode 12, an insulating state may be destroyed by, for example, irradiating the overlap location of the connectable portion 36 and the source metal portion 35C2 of the second drain electrode 35C and the overlap location of the connectable portion 36 and the extension portion 34A of the pixel electrode connecting portion 34 with the laser beam, respectively. At this time, both the source metal portion 35C2 of the second drain electrode 35C that overlaps the connectable portion 36 formed of the second metal film 25 which is a gate metal film via the third insulating film 26 which is an insulating film and the extension portion 34A of the pixel electrode connecting portion 34 are formed of the third metal film 27 which is a source metal film. Therefore, the connection reliability is high when the connection is performed by irradiating these portions with a laser beam.

At least two pixel electrodes 12, each of which is the pixel electrode 12 that is disposed adjacent to both the gate wiring 13 and the source wiring 14, are disposed so as to interpose the gate wiring 13, and a second connectable portion 37 is provided. The second connectable portion 37 can be connected to one of the pixel electrodes 12 disposed so as to interpose the gate wiring 13 with respect to the other of the pixel electrode 12 which is the connection target of the first transistor 11 and the second transistor 35 that are connected to the gate wiring 13, and is disposed so as to overlap the first source electrode 11B via the first insulating film 22 which is an insulating film. When the pixel electrode 12 is charged as the second transistor 35 is driven in a state where the second drain electrode 35C of the second transistor 35 and the pixel electrode 12 are connected to the connectable portion 36, there is a concern that a parasitic capacitance may be generated between the source wiring 14 and the second drain electrode 35C connected to the second channel region 35D overlapping the source wiring 14. In that case, the pixel electrode 12 which is the connection target of the first transistor 11 and the second transistor 35 connected to the gate wiring 13 is connected to the second connectable portion 37. As a result, an electrostatic capacitance is formed between the second connectable portion 37 and the first source electrode 11B of the overlapping first transistor 11 via the first insulating film 22 which is an insulating film. Therefore, if the image signals having potentials of polarities opposite to each other are supplied to the two source wirings 14 interposing the pixel electrode 12 at the same timing, even when a parasitic capacitance is generated between the second drain electrode 35C connected to the second channel region 35D overlapping the one source wiring 14 and the one source wiring 14, and the potential of the pixel electrode 12 fluctuates in the positive direction, for example, since the electrostatic capacitance generated between the second connectable portion 37 and the first source electrode 11B connected to the other source wiring 14 can fluctuate the potential of the pixel electrode 12 in the negative direction, it is possible to reduce the fluctuation of the potential of the pixel electrode 12 due to the parasitic capacitance.

The gate wiring 13 is formed of the second metal film 25 which is a gate metal film, whereas the source wiring 14 is formed of the third metal film 27 which is a source metal film disposed in a different layer from the second metal film 25 which is a gate metal film via the third insulating film 26 which is an insulating film. In the first transistor 11 and the second transistor 35, the first channel region 11D and the second channel region 35D are formed of the semiconductor film 23 so as to be disposed in different layers from the second metal film 25 which is a gate metal film and the third metal film 27 which is a source metal film via the second insulating film 24 which is an insulating film, respectively. The second drain electrode 35C is the source metal portion 35C2 formed of the third metal film 27, at least a portion of which is a source metal film, whereas the pixel electrode 12 is connected to the pixel electrode connecting portion 34 formed of the third metal film 27 which is a source metal film. The connectable portion 36 is formed of the second metal film 25 which is a gate metal film, and is disposed so as to overlap the source metal portion 35C2 and the pixel electrode connecting portion 34 via the third insulating film 26 which is an insulating film, whereas the second connectable portion 37 is formed of the second metal film 25, at least a portion of which is a gate metal film, and is disposed so as to overlap the pixel electrode connecting portion 34 via the third insulating films 26 which is an insulating film. With such a configuration, when the connectable portion 36 is connected to the second drain electrode 35C and the pixel electrode 12, an insulating state may be destroyed by, for example, irradiating the overlap location of the connectable portion 36 and the source metal portion 35C2 of the second drain electrode 35C and the overlap location of the connectable portion 36 and the pixel electrode connecting portion 34 with the laser beam, respectively. On the other hand, when the second connectable portion 37 is connected to the pixel electrode 12, an insulating state may be destroyed by, for example, irradiating the overlap location of the second connectable portion 37 and the pixel electrode connecting portion 34 with the laser beam. At this time, both the source metal portion 35C2 of the second drain electrode 35C that overlaps the connectable portion 36 formed of the second metal film 25 which is a gate metal film via the third insulating film 26 which is an insulating film and the pixel electrode connecting portion 34 are formed of the third metal film 27 which is a source metal film, and the pixel electrode connecting portion 34 that overlaps the second connectable portion 37 formed of the second metal film 25, at least a portion of which is a gate metal film, via the third insulating film 26 which is an insulating film is formed of the third metal film 27 which is a source metal film. Therefore, in addition to high reliability of connection when the connection is performed by irradiating these portions with a laser beam, workability is good because it is not necessary to individually adjust the output of laser beam.

In the first transistor 11 and the second transistor 35, the first channel region 11D and the second channel region 35D are formed of the semiconductor film 23 disposed in a different layer from the source wiring 14 via the third insulating film 26 which is an insulating film, and the first source electrode 11B, the first drain electrode 11C, the second source electrode 35B, and the second drain electrode 35C are formed of the resistance lowering region 23L obtained by lowering the resistance in a portion of the semiconductor film 23. In this manner, the first source electrode 11B and the first drain electrode 11C are directly continuous with the first channel region 11D to achieve mutual connection. Similarly, the second source electrode 35B and the second drain electrode 35C are directly continuous with the second channel region 35D to achieve mutual connection. As compared with the case where the second source electrode and the second drain electrode are disposed in the same layer as the source wiring 14, the degree of freedom of arrangement of the second transistor 35 is improved.

The gate wiring 13, the first gate electrode 11A, and the second gate electrode 35A are formed of the second metal film 25, which is a gate metal film, disposed on the upper layer side of the semiconductor film 23 via the second insulating film 24 which is an insulating film. The portion of the semiconductor film 23 which does not overlap the second metal film 25 which is a gate metal film is the resistance lowering region 23L. In this manner, the first transistor 11 and the second transistor 35 are so-called top gate types. At the time of manufacturing, the resistance lowering treatment is performed by using the second metal film 25, which is a gate metal film, disposed on the upper layer side of the semiconductor film 23 via the second insulating film 24 which is an insulating film as a mask. Therefore, the portion of the semiconductor film 23 that does not overlap the second metal film 25 which is a gate metal film can be used as the resistance lowering region 23L. In such a configuration, for example, in a case where a disconnection occurs in the first gate electrode 11A, a portion of the overlapping first channel region 11D is the resistance lowering region 23L, and there is a possibility that the first transistor 11 may normally be energized. Even in that case, the pixel electrode 12 can be appropriately charged by separating the first drain electrode 11C from the pixel electrode 12 and connecting the second drain electrode 35C and the pixel electrode 12 to the connectable portion 36.

The first transistor 11 includes a lower layer side first gate electrode 11E that is formed of the first metal film 21, which is a lower layer side gate metal film, disposed on the lower layer side of the semiconductor film 23 via the first insulating film 22 which is an insulating film, is disposed so as to overlap the first channel region 11D, and is connected to the first gate electrode 11A. The second transistor 35 includes a lower layer side second gate electrode 35E that is formed of the first metal film 21 which is the lower layer side gate metal film, is disposed so as to overlap the second channel region 35D, and is connected to the second gate electrode 35A. In this manner, as compared with the case where each of the transistors has a configuration in which only one gate electrode is disposed so as to overlap the channel region, the current flowing in each of the channel regions 11D and 35D can be increased. As a result, the pixel electrode 12 can be sufficiently charged even in a short charging time.

The lower layer side gate wiring 17 that is formed of the first metal film 21 which is the lower layer side gate metal film, is disposed so as to overlap the gate wiring 13, and is connected to the gate wiring 13, the lower layer side first gate electrode 11E, and the lower layer side second gate electrode 35E is provided. In this manner, a signal is transmitted by the gate wiring 13 and the lower layer side gate wiring 17 which are connected to each other, which is suitable for reducing wiring resistance. Even in a case where a disconnection occurs in any one of the gate wiring 13 and the lower layer side gate wiring 17, the signal can be continuously supplied by the other that does not cause the disconnection, so that the redundancy is good.

The resistance lowering source wiring 31 that is formed of the resistance lowering region 23L, is disposed so as to overlap the source wiring 14, and is connected to the source wiring 14 is provided. In this manner, the signal is transmitted by the source wiring 14 and the resistance lowering source wiring 31 which are connected to each other, which is suitable for reducing the wiring resistance. Even in a case where a disconnection occurs in any one of the source wiring 14 or the resistance lowering source wiring 31, the signal can be continuously supplied by the other that does not cause the disconnection, so that the redundancy is good.

The gate wiring 13 is provided with a widened portion 13W at a position not overlapping the source wiring 14. The widened portion 13W is provided by utilizing the fact that the degree of freedom in design is increased in the portion of the gate wiring 13 that does not overlap the source wiring 14. The widened portion 13W can reduce the wiring resistance in the gate wiring 13.

The liquid crystal layer 10C and the spacer 16 that is disposed so as to penetrate the liquid crystal layer 10C, holds the thickness of the liquid crystal layer 10C, and is disposed so as to overlap the widened portion 13W are provided. In this manner, the spacer 16 can hold the thickness of the liquid crystal layer 10C. Since the spacer 16 is disposed so as to overlap the widened portion 13W of the gate wiring 13 where the flatness is ensured, it is unlikely to occur a defect such as a defective cell gap due to a displacement.

Embodiment 2

Embodiment 2 will be described with reference to FIGS. 15 to 20. In Embodiment 2, a configuration of a pixel electrode 112 is changed. Duplicated description of the same structure, operation, and effect as those of above Embodiment 1 will be omitted.

Figure 15:
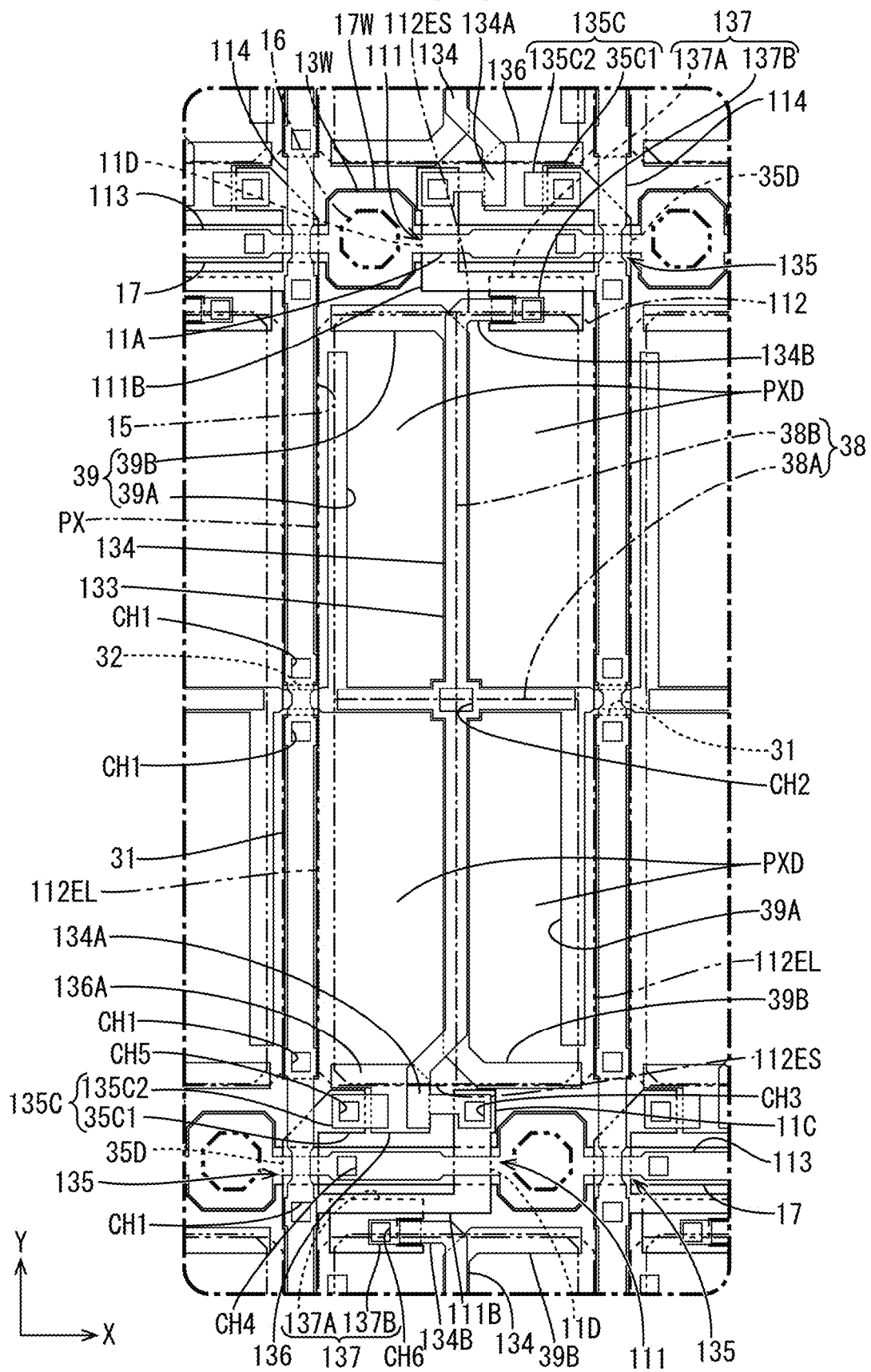
FIG. 15 is a plan view illustrating a pixel array on an array substrate that constitutes a liquid crystal panel according to Embodiment 2.
Figure 16:
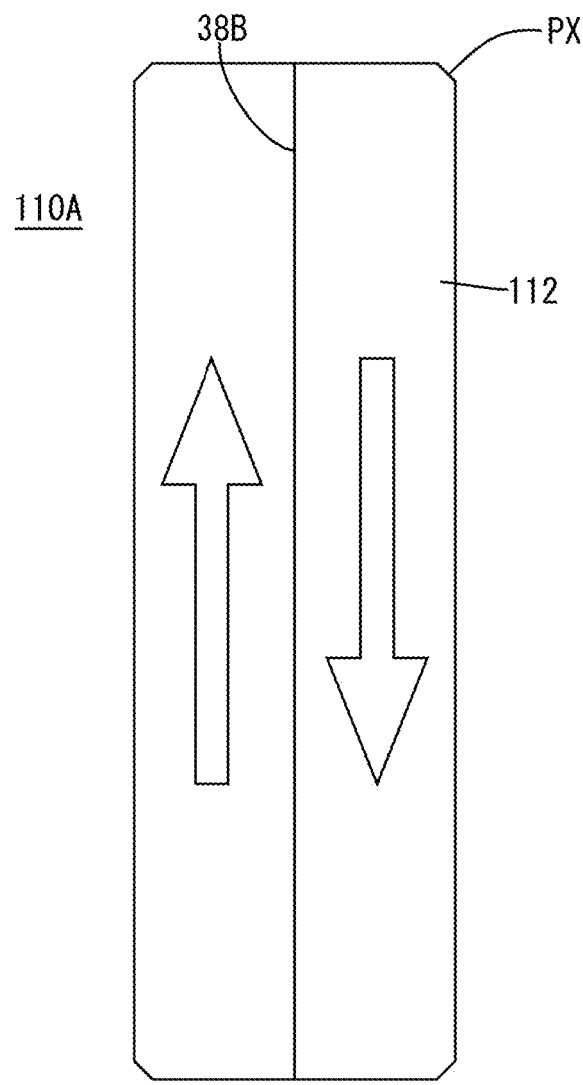
FIG. 16 is a diagram for describing an alignment treatment on an alignment film of the array substrate.
Figure 17:
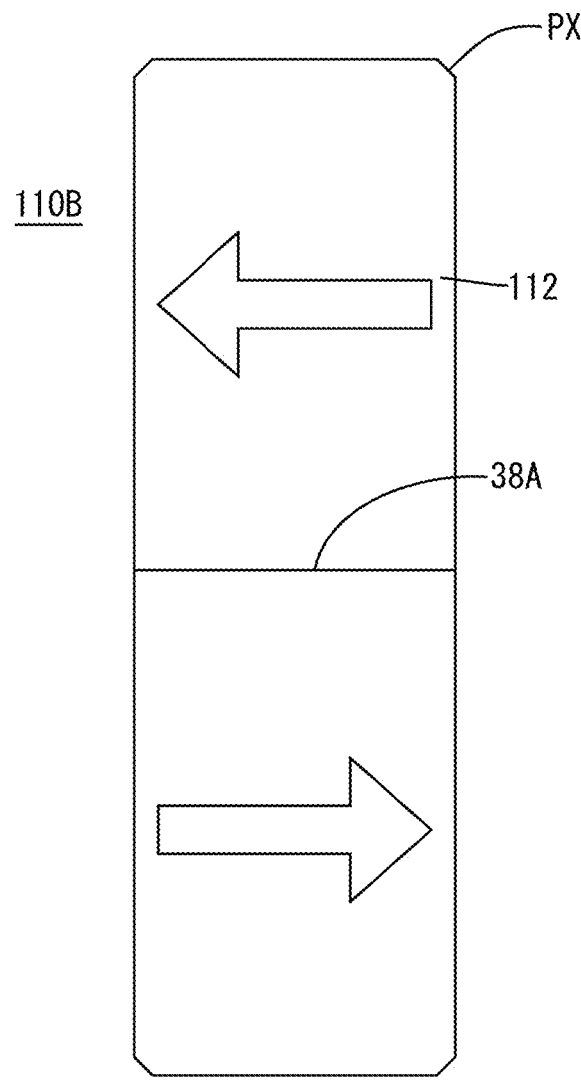
FIG. 17 is a diagram for describing the alignment treatment on the alignment film of a CF substrate.
Figure 18:
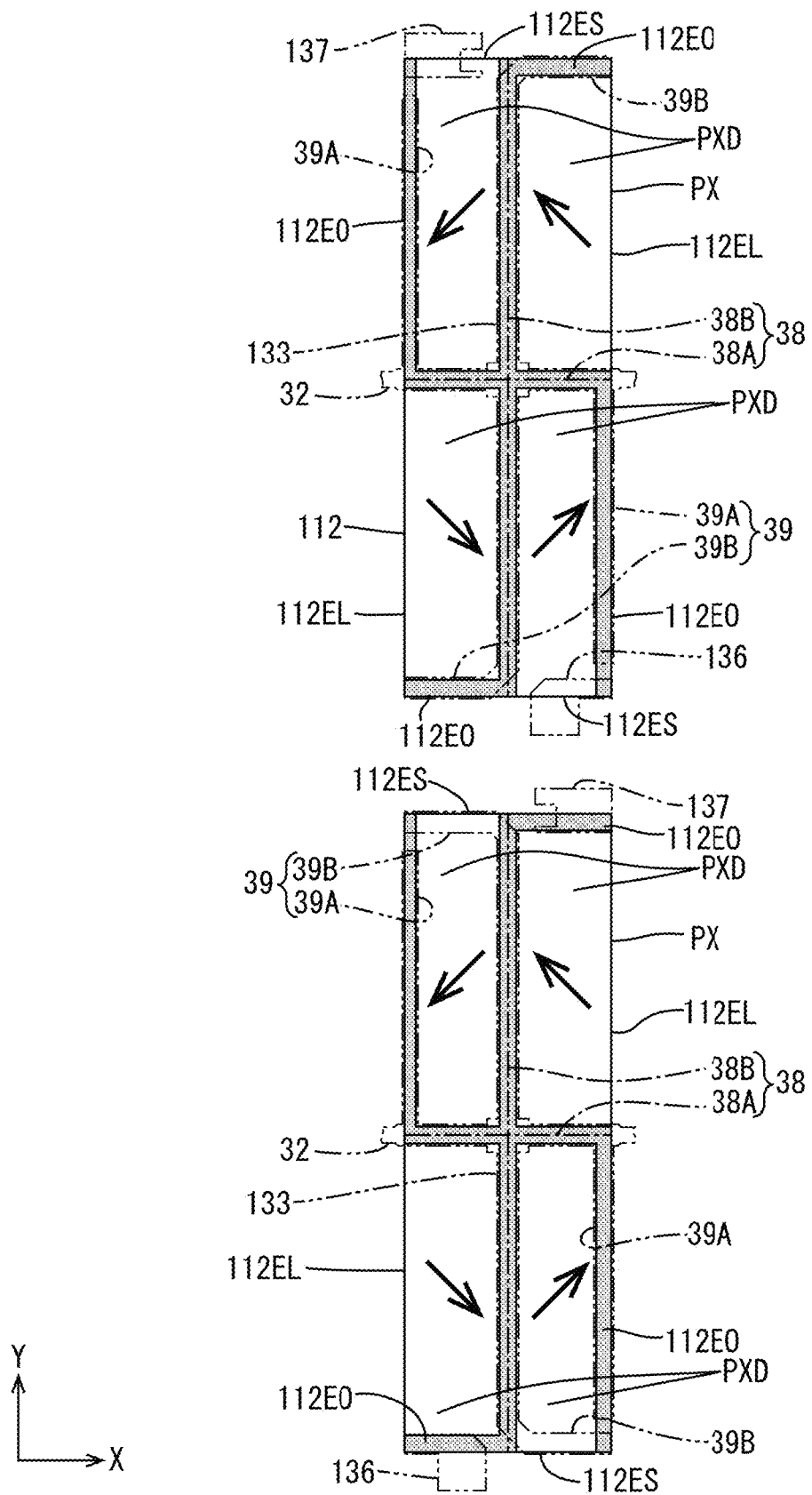
FIG. 18 is a diagram for describing a tilt direction of liquid crystal molecules in one pixel portion of the liquid crystal panel.

FIG. 15 is a plan view of the display region on the array substrate 110A. As illustrated in FIG. 15, the pixel electrode 112 according to the present embodiment has a vertically long rectangular shape and does not include the slit 12S (refer to FIG. 2) as described in Embodiment 1. In the present embodiment, a specific alignment treatment is performed on the alignment film as the configuration of the pixel electrode 112 is changed. As described in Embodiment 1, the alignment film is provided in a solid shape on each innermost surface of both substrates 110A and 110B, and is illustrated by reference numeral "10E" in FIG. 3. Here, the alignment treatment of the alignment film will be described in detail with reference to FIGS. 16 to 18. FIG. 16 is a diagram for describing the alignment treatment on the alignment film of the array substrate 110A, and is a diagram of the array substrate 110A viewed from the liquid crystal layer side. FIG. 17 is a diagram for describing the alignment treatment on the alignment film of the CF substrate 110B, and is a diagram of the CF substrate 110B viewed from a side opposite to the liquid crystal layer side, that is, a side to which the polarizing plate is attached. FIG. 18 is a diagram for describing a tilt direction (alignment direction) of liquid crystal molecules in two pixel portions PX disposed along the Y axis direction in the liquid crystal panel, and is a diagram viewed from the CF substrate 110B side with the array substrate 110A facing down and the CF substrate 110B facing up.

The alignment film provided on the innermost surface of each of the substrates 110A and 110B is a vertical alignment film that aligns a long axis of liquid crystal molecules contained in the liquid crystal layer substantially perpendicularly to the film surface of the substrate in a state where no voltage is applied to the liquid crystal layer. That is, in the liquid crystal panel according to the present embodiment, the display mode is a vertical alignment (VA) mode, and more specifically, the alignment of the liquid crystal molecules is different for each of the four domains PXD that divides the pixel portion PX illustrated in FIG. 15, and for example, a 4-domain reverse twisted nematic (4D-RTN) mode is set. In the present embodiment, the four domains PXD that divide the pixel portion PX substantially match the four domains 12D in the pixel electrode 12 described in above Embodiment 1. Specifically, the alignment film is an optical alignment film capable of imparting an alignment regulating force to liquid crystal molecules by subjecting the surface thereof to an optical alignment treatment, and the optical alignment treatment corresponds to a plurality of domains PXD described above. That is, in the alignment film on the array substrate 110A side, as illustrated in FIG. 16, in the manufacturing process, each of two regions aligned along the X axis direction with the center position in the X axis direction in each pixel portion PX as a boundary is irradiated with alignment treatment lights (polarized ultraviolet rays) that are opposite to each other along the Y axis direction. In FIG. 16, an irradiation direction of the alignment treatment light is illustrated by a hollow arrow. In the present embodiment, the left side region illustrated in FIG. 16 is irradiated with the upward alignment treatment light in the same figure, and the right side region illustrated in FIG. 16 is irradiated with the downward alignment treatment light in the same figure, respectively. When irradiating the alignment treatment lights opposite to each other, a mask is used so that unnecessary portions are not irradiated with the alignment treatment light. On the other hand, in the alignment film on the CF substrate 110B side, as illustrated in FIG. 17, in the manufacturing process, each of two regions aligned along the Y axis direction with the center position in the Y axis direction in each pixel portion PX as a boundary is irradiated with alignment treatment lights that are opposite to each other along the X axis direction. In FIG. 17, the irradiation direction of the alignment treatment light is illustrated by a hollow arrow. In the present embodiment, the upper side region illustrated in FIG. 17 is irradiated with the leftward alignment treatment light in the same figure, and the lower side region illustrated in FIG. 17 is irradiated with the rightward alignment treatment light in the same figure, respectively.

As illustrated in FIG. 18, the pixel portion PX is divided into four domains PXD in which the tilt directions of the liquid crystal molecules (alignment direction, direction where the liquid crystal molecules fall when a voltage is applied to the liquid crystal layer) are different from each other by a pair of alignment films on which the optical alignment treatment is performed. In FIG. 18, the tilt directions of the liquid crystal molecules near the center in the thickness direction of the liquid crystal layer are illustrated by solid arrows. Hereinafter, description will be made using two pixel portions PX. As described above, the four domains PXD included in each of the two pixel portions PX are arranged two by two in a matrix in the X axis direction and the Y axis direction. At the boundary positions of the four domains PXD, the alignments of liquid crystal molecules are different from any of the four domains PXD, and these are alignment boundary portions 38. The alignment film has a substantially cross-shaped alignment boundary portion 38 when viewed in plan. The alignment boundary portion 38 is configured to include a first alignment boundary portion 38A extending along the X axis direction and a second alignment boundary portion 38B extending along the Y axis direction. In FIGS. 15 and 18, the alignment boundary portions 38 of the four domains PXD are illustrated by one-dot chain lines. It is difficult for the alignment boundary portion 38 to appropriately control the alignment state of the liquid crystal molecules, and it tends to be a dark portion where the light amount is locally small. In FIG. 18, the dark portion generation region is illustrated in a mesh shape. In the present embodiment, the tilt directions of the liquid crystal molecules in the four domains PXD are set so as to differ from each other by an integral multiple of 90 degrees. That is, in the upper right domain PXD illustrated in FIG. 18, the tilt direction of the liquid crystal molecules is diagonally left upward, in the upper left domain PXD illustrated in FIG. 18, the tilt direction of the liquid crystal molecules is diagonally left downward, in the lower left domain PXD illustrated in FIG. 18, the tilt direction of the liquid crystal molecules is diagonally right downward, and in the lower right domain PXD illustrated in FIG. 18, the tilt direction of the liquid crystal molecules is diagonally right upward. As described above, since the alignments of the liquid crystal molecules disposed in each domain PXD are regulated in different directions by the pair of alignment films, the viewing angle characteristics relating to the image displayed on the liquid crystal panel are averaged, so that good display performance can be obtained.

Figure 19:
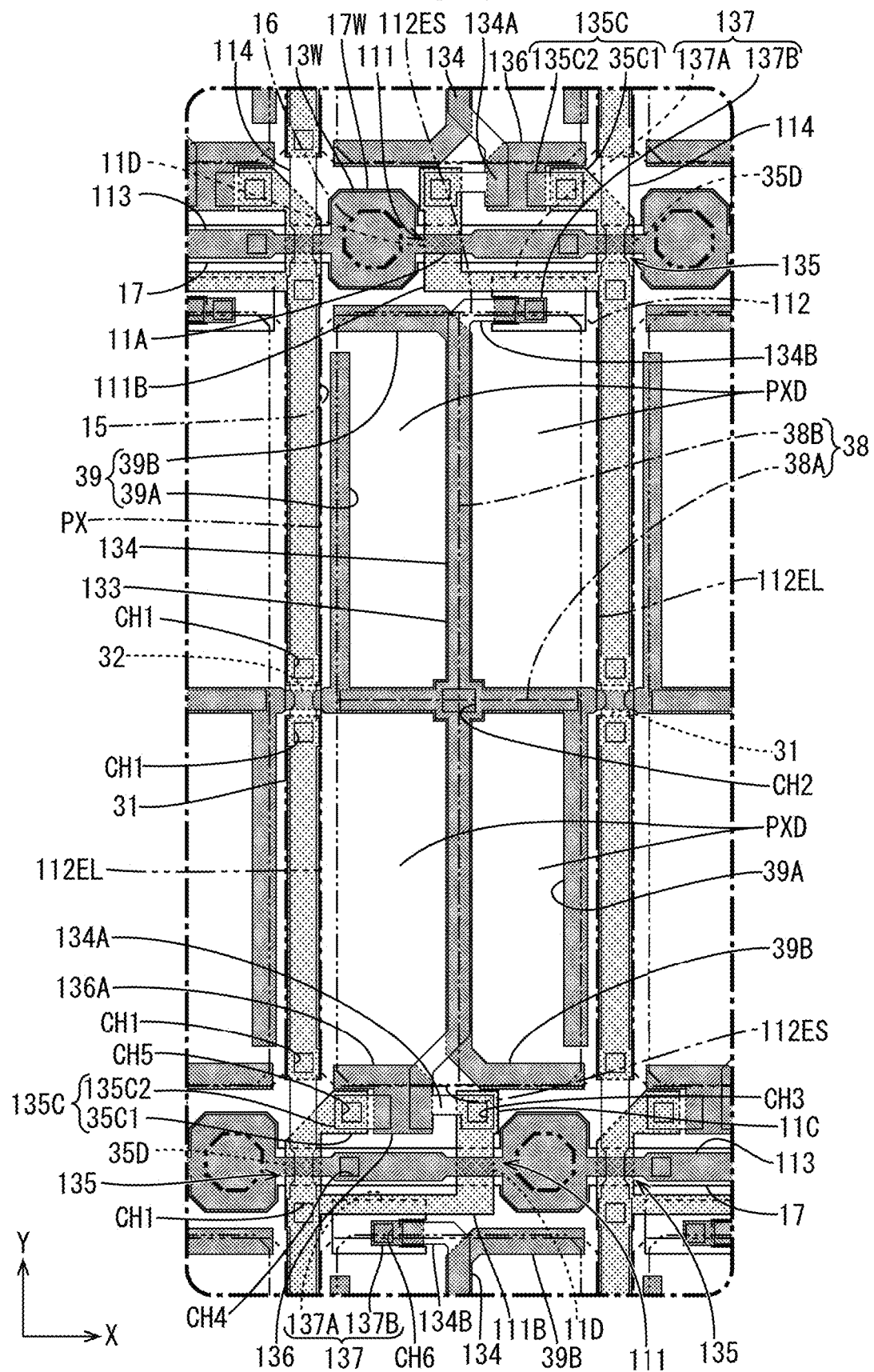
FIG. 19 is a plan view mainly illustrating the patterns of the semiconductor film and the second metal film provided on the array substrate.
Figure 20:
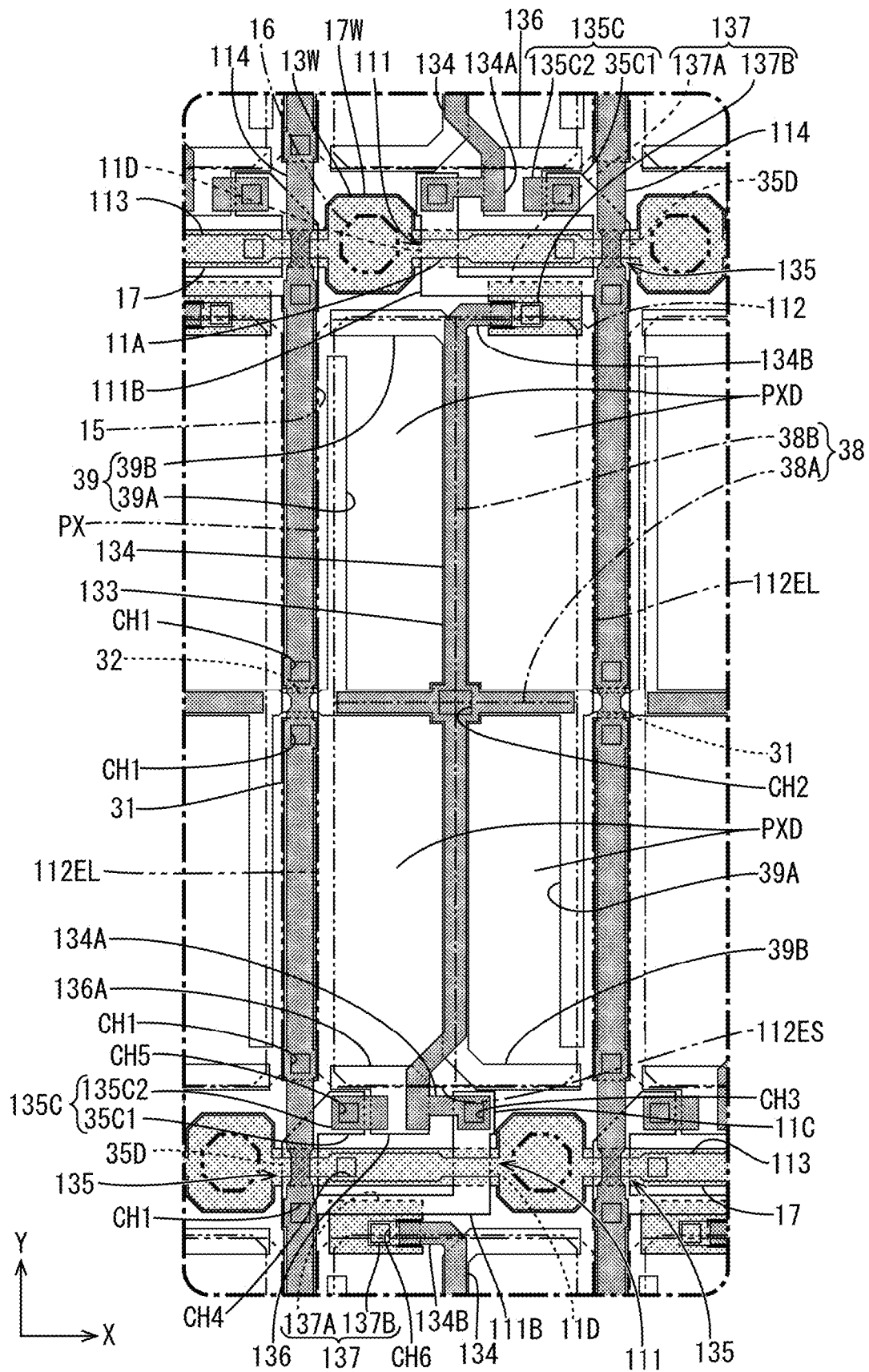
FIG. 20 is a plan view mainly illustrating the patterns of the first metal film and the third metal film provided on the array substrate.

FIG. 19 is a view illustrating the semiconductor film and the second metal film in a mesh shape and the first metal film and the third metal film in a hollow shape in the same plan view as FIG. 15. FIG. 20 is a view illustrating the first metal film and the third metal film in a mesh shape and the semiconductor film and the second metal film in a hollow shape in the same plan view as FIG. 15. As illustrated in FIGS. 19 and 20, a capacitance forming portion 133 and a pixel electrode connecting portion 134 are disposed so as to overlap each other at the alignment boundary portion 38 located at the boundary between each of the domains PXD whose alignment is regulated as described above. More specifically, in the capacitance forming portion 133 and the pixel electrode connecting portion 134, a portion extending along the X axis direction overlaps the first alignment boundary portion 38A forming the alignment boundary portion 38 over substantially the entire length, whereas a portion extending along the Y axis direction is disposed so as to overlap the second alignment boundary portion 38B over substantially the entire length. As described above, the alignment boundary portion 38 is difficult to appropriately control the alignment state of the liquid crystal molecules, and tends to be a dark portion where the amount of light is locally small. In particular, the dark portion caused by the alignment boundary portion 38 may fluctuate in position and width due to the alignment accuracy of the mask used when performing the optical alignment treatment on the surface of the alignment film formed on the array substrate 110A. When there is a portion where the width of the dark portion is different in the display region, it tends to be likely to be visually recognized as display unevenness. By disposing the capacitance forming portion 133 and the pixel electrode connecting portion 134 to overlap the alignment boundary portion 38, display unevenness due to the alignment boundary portion 38 is unlikely to be visually recognized, and a decrease in luminance due to the capacitance forming portion 133 and the pixel electrode connecting portion 134 being disposed so as to overlap the pixel electrode 112 is suppressed.

Here, the relationship between an outer peripheral edge portion of the pixel electrode 112 and the tilt direction of the liquid crystal molecules near the center in the thickness direction of the liquid crystal layer will be described in detail with reference to FIG. 18. As illustrated in FIG. 18, the outer peripheral edge portion of the pixel electrode 112 constitutes two outer sides of the four domains PXD of the pixel portion PX, excluding the two sides of the alignment boundary portion 38 side. On the other hand, the tilt directions of the liquid crystal molecules included in the liquid crystal layer are different from each other by an integral multiple of 90 degrees in each domain PXD, as described above. Therefore, in the upper right domain PXD illustrated in FIG. 18, the azimuth direction orthogonal to an edge portion 112EL on the longitudinal side of the pixel electrode 112 and directed toward the inside of the pixel electrode 112 forms an acute angle (an angle not exceeding 90 degrees) with the tilt direction of the liquid crystal molecules, whereas the azimuth direction orthogonal to an edge portion 112ES on the short side of the pixel electrode 112 and directed toward the inside of the pixel electrode 112 forms an obtuse angle (angle exceeding 90 degrees) with the tilt direction of the liquid crystal molecules. Similarly, in the upper left domain PXD illustrated in FIG. 18, the azimuth direction orthogonal to the edge portion 112EL on the longitudinal side of the pixel electrode 112 and directed toward the inside of the pixel electrode 112 forms an obtuse angle with the tilt direction of the liquid crystal molecules, whereas the azimuth direction orthogonal to the edge portion 112ES on the short side of the pixel electrode 112 and directed toward the inside of the pixel electrode 112 forms an acute angle with the tilt direction of the liquid crystal molecules. Similarly, in the lower left domain PXD illustrated in FIG. 18, the azimuth direction orthogonal to an edge portion 112EL on the longitudinal side of the pixel electrode 112 and directed toward the inside of the pixel electrode 112 forms an acute angle with the tilt direction of the liquid crystal molecules, whereas the azimuth direction orthogonal to an edge portion 112ES on the short side of the pixel electrode 112 and directed toward the inside of the pixel electrode 112 forms an obtuse angle with the tilt direction of the liquid crystal molecules. In the lower right domain PXD illustrated in FIG. 18, the azimuth direction orthogonal to an edge portion 112EL on the longitudinal side of the pixel electrode 112 and directed toward the inside of the pixel electrode 112 forms an obtuse angle with the tilt direction of the liquid crystal molecules, whereas the azimuth direction orthogonal to an edge portion 112ES on the short side of the pixel electrode 112 and directed toward the inside of the pixel electrode 112 forms an acute angle with the tilt direction of the liquid crystal molecules.

Incidentally, as illustrated in FIG. 15, an electric field generated between the pixel electrode 112 and the gate wiring 113 or the source wiring 114 exists near the outer peripheral edge portion of the pixel electrode 112. The electric field can exert an alignment regulating force on the liquid crystal molecules contained in the liquid crystal layer. As illustrated in FIG. 18, the electric field generated in the vicinity of an obtuse-angled edge portion 112EO, which is an edge portion included in the outer peripheral edge portion of the pixel electrode 112 and in which an azimuth direction orthogonal to the edge portion and directed toward the inside of the pixel electrode 112 forms an obtuse angle with the tilt direction of the liquid crystal molecules, causes the liquid crystal molecules to exert an alignment regulating force in the direction opposite to the tilt direction. Therefore, the alignment of the liquid crystal molecules is likely to be disturbed in the vicinity of the obtuse-angled edge portion 112EO, and there is a risk of being visually recognized as a dark portion. In particular, the width of the dark portion due to disordered alignment of the liquid crystal molecules described above may fluctuate slightly depending on the intensity of the electric field generated near the obtuse-angled edge portion 112EO. The intensity of the electric field described above fluctuates depending on the distance between the edge portion of the pixel electrode 112 and the side edge portions of the gate wiring 113 and the source wiring 114, the thickness of each insulating film, and the like. Therefore, when there is a portion where the width of the dark portion is different in the display region, it tends to be likely to be visually recognized as display unevenness.

Therefore, as illustrated in FIGS. 18 and 19, a connectable portion 136 according to the present embodiment includes one that is disposed so as to overlap at least a portion of the obtuse-angled edge portion 112EO included in the outer peripheral edge portion of the pixel electrode 112. The connectable portion 136 has a pixel electrode overlapping portion 136A that overlaps the edge portion 112ES on the short side of the outer peripheral edge portion of the pixel electrode 112, in addition to the portion overlapping the source metal portion 135C2 of the second drain electrode 135C which is the connection target and the extension portion 134A of the pixel electrode connecting portion 134. The pixel electrode overlapping portion 136A is restricted so that the formation range in the X axis direction does not exceed the second alignment boundary portion 38B, so that is not short-circuited with the capacitance forming portion 133 formed of the same second metal film. As described in Embodiment 1, the connectable portion 136 are arranged in a zigzag pattern so that the pixel portions PX adjacent to each other in the Y axis direction are alternately unevenly distributed on one side and the other side in the X axis direction according to the arrangement of the second transistor 135 which is the connection target. Specifically, the connectable portion 136 is unevenly distributed on the left side or the right side illustrated in FIGS. 18 and 19 with respect to the second alignment boundary portion 38B. Of these, the connectable portion 136, which is unevenly distributed on the left side in FIGS. 18 and 19 with respect to the second alignment boundary portion 38B, is disposed so as to overlap the obtuse-angled edge portion 112EO on the short side existing in the lower left domain PXD illustrated in FIGS. 18 and 19 in the outer peripheral edge portion of the pixel electrode 112. In this manner, even when the alignment regulating force by the electric field generated near the obtuse-angled edge portion 112EO above described acts to disturb the alignment of the liquid crystal molecules, display defects due to disordered alignment of the liquid crystal molecules are unlikely to be visually recognized by the connectable portion 136. As a result, the display quality is kept good.

Furthermore, as illustrated in FIGS. 18 to 20, a second connectable portion 137 according to the present embodiment includes one that is disposed so as to overlap at least a portion of the obtuse-angled edge portion 112EO included in the outer peripheral edge portion of the pixel electrode 112. The second connectable portion 137 are arranged in a zigzag pattern so that the pixel portions PX adjacent to each other in the Y axis direction are alternately unevenly distributed on one side and the other side in the X axis direction according to the arrangement of the connectable portions 136, in order to have an arrangement substantially diagonal to the connectable portion 136 described above. Accordingly, the pixel electrode connecting portion 134, which is the connection target of the second connectable portion 137, has a second extension portion 134B that is bent from a portion extending along the Y axis direction toward the second connectable portion 137 side. The second extension portions 134B are arranged in a zigzag pattern so that the pixel portions PX adjacent to each other in the Y axis direction are alternately unevenly distributed on one side and the other side in the X axis direction according to the arrangement of the second connectable portions 137. In the second connectable portion 137, the first overlapping portion 137A is disposed so as to overlap the edge portion 112ES on the short side of the outer peripheral edge portion of the pixel electrode 112, in addition to the first source electrode 111B which is an original overlapping target. The second overlapping portion 137B is disposed so as to overlap the edge portion 112ES on the short side of the pixel electrode 112, in addition to the second extension portion 134B of the pixel electrode connecting portion 134 which is the connection target. More specifically, the second connectable portion 137 is unevenly distributed on the left side or the right side illustrated in FIGS. 18 to 20 with respect to the second alignment boundary portion 38B. Of these, the second connectable portion 137, which is unevenly distributed to the right side illustrated in FIGS. 18 to 20 with respect to the second alignment boundary portion 38B, is disposed so as to overlap the obtuse-angled edge portion 112EO on the short side existing in the upper right domain PXD illustrated in FIGS. 18 to 20 of the outer peripheral edge portion of the pixel electrode 112. In this manner, even when the alignment regulating force by the electric field generated near the obtuse-angled edge portion 112EO above described acts to disturb the alignment of the liquid crystal molecules, display defects due to disordered alignment of the liquid crystal molecules are unlikely to be visually recognized by the second connectable portion 137. As a result, the display quality is kept good.

Furthermore, as illustrated in FIGS. 18 and 19, in the capacitance forming portion 133, an edge light shielding portion 39 is disposed so as to overlap at least a portion of the obtuse-angled edge portion 112EO included in the outer peripheral edge portion of the pixel electrode 112. The edge light shielding portion 39 is formed of the same second metal film as the capacitance forming portion 133 and is directly continuous with the capacitance forming portion 133. More specifically, a pair of the edge light shielding portions 39 is provided so as to be continuous with both end portions of a portion extending along the X axis direction and both end portions of a portion extending along the Y axis direction of the capacitance forming portion 133, respectively. The pair of edge light shielding portions 39 continuous with the portion of the capacitance forming portion 133 extending along the X axis direction has a longitudinal shape extending along the Y axis direction and is disposed so as to overlap the edge portion 112EL on the longitudinal side of each of the upper left and lower right domains PXD illustrated in FIGS. 18 and 19, that is, the obtuse-angled edge portion 112EO on the longitudinal side of the outer peripheral edge portion of the pixel electrode 112. In this manner, even when the alignment regulating force by the electric field generated near the obtuse-angled edge portion 112 EO on the longitudinal side above described acts to disturb the alignment of the liquid crystal molecules, display defects due to disordered alignment of the liquid crystal molecules are unlikely to be visually recognized by the edge light shielding portion 39 on the longitudinal side. As a result, the display quality is kept good.

On the other hand, the pair of edge light shielding portions 39 continuous with the portion of the capacitance forming portion 133 extending along the Y axis direction has a short shape extending along the X axis direction as illustrated in FIGS. 18 and 19, and is disposed so as to overlap the edge portion 112ES on the short side each of the upper left and lower right or the lower left and upper right domains PXD illustrated in FIGS. 18 and 19 of the outer peripheral edge portion of the pixel electrode 112. The pair of edge light shielding portions 39 on the short side is arranged in a zigzag arrangement, which has an inverse relationship to the arrangement of the connectable portions 136 and the second connectable portions 137, so that short-circuiting between the connectable portion 136 and the second connectable portion 137 is avoided. That is, the edge light shielding portion 39 on the short side, the connectable portion 136, and the second connectable portion 137 are complementarily arranged so as to overlap the edge portion 112ES on each short side in each domain PXD in all the pixel portions PX disposed along the Y axis direction. More specifically, in the pixel portion PX in which the connectable portion 136 is unevenly distributed on the left side in FIGS. 18 and 19, the edge light shielding portion 39 on the short side, which is unevenly distributed on a side opposite to the connectable portion 136 with the second alignment boundary portion 38B interposed therebetween, overlaps the edge portion 112ES on the short side in the lower right domain PXD illustrated in FIGS. 18 and 19. In the pixel portion PX in which the second connectable portion 137 is unevenly distributed on the right side illustrated in FIGS. 18 and 19, the edge light shielding portion 39 on the short side, which is unevenly distributed on a side opposite to the second connectable portion 137 with the second alignment boundary portion 38B interposed therebetween, overlaps the edge portion 112ES on the short side in the upper left domain PXD illustrated in FIGS. 18 and 19. In this manner, even when the alignment regulating force by the electric field generated near each of the obtuse-angled edge portions 112 EO where the connectable portion 136 and the second connectable portion 137 do not overlap each other acts to disturb the alignment of the liquid crystal molecules, display defects due to disordered alignment of the liquid crystal molecules are unlikely to be visually recognized by the edge light shielding portion 39 on the short side. As a result, the display quality is kept good.

As described above, according to the present embodiment, the liquid crystal layer containing liquid crystal molecules, the plurality of domains PXD having different alignment directions of liquid crystal molecules when a voltage is applied to the liquid crystal layer, the alignment boundary portion 38 located at a boundary between the plurality of domains PXD, the alignment film for aligning the liquid crystal molecules, and the pixel electrode connecting portion 134 connected to the pixel electrode 112 and connectable to the connectable portion 136 are provided. The alignment boundary portion 38 is configured to include the first alignment boundary portion 38A extending along the extending direction of the gate wiring 113, and the second alignment boundary portion 38B extending along the extending direction of the source wiring 114. The pixel electrode connecting portion 134 has a light shielding property and is disposed so as to overlap the first alignment boundary portion 38A and the second alignment boundary portion 38B. In this manner, since the first alignment boundary portion 38A extending along the extending direction of the gate wiring 113 and the second alignment boundary portion 38B extending along the extending direction of the source wiring 114 partition four domains PXD having different alignment directions of liquid crystal molecules, this is suitable for improving the viewing angle characteristics. The first alignment boundary portion 38A and the second alignment boundary portion 38B forming the alignment boundary portion 38 are disposed so that the pixel electrode connecting portion 134 having a light shielding property is overlapped. Therefore, it is difficult to visually recognize display unevenness due to variations in the width of the dark portion and the like that occur near the first alignment boundary portion 38A and the second alignment boundary portion 38B.

The connectable portion 136 is an edge portion included in the outer peripheral edge portion of the pixel electrode 112, and is disposed so as to overlap at least a portion of the obtuse-angled edge portion 112EO in which an azimuth direction orthogonal to the edge portion and directed toward the inside of the pixel electrode 112 forms an obtuse angle with respect to a tilt direction of liquid crystal molecules when a voltage is applied to the liquid crystal layer. An electric field generated between the pixel electrode 112 and another conductor exists near the outer peripheral edge portion of the pixel electrode 112, and the electric field can exert an alignment regulating force on the liquid crystal molecules contained in the liquid crystal layer. The outer peripheral edge portion of the pixel electrode 112 includes the following edge portions. That is, the azimuth direction of the edge portion orthogonal to the edge portion and directed toward the inside of the pixel electrode 112 forms an obtuse angle with respect to the tilt direction of the liquid crystal molecules when a voltage is applied to the liquid crystal layer. The electric field generated near the obtuse-angled edge portion 112EO exerts an alignment regulating force in the direction opposite to the tilt direction described above on the liquid crystal molecules, so that the alignment of the liquid crystal molecules is likely to be disturbed near the obtuse-angled edge portion 112EO. In that respect, the connectable portion 136 is disposed so as to overlap at least a portion of the obtuse-angled edge portion 112EO described above in the outer peripheral edge portion of the pixel electrode 112. Therefore, even when the alignment regulating force by the electric field acts to disturb the alignment of the liquid crystal molecules, display defects due to disordered alignment of the liquid crystal molecules are unlikely to be visually recognized. As a result, the display quality is kept good.

The capacitance forming portion 133 disposed so as to overlap the pixel electrode connecting portion 134 via the third insulating film which is an insulating film, and the edge light shielding portion 39 continuous with the capacitance forming portion 133 and disposed so as to overlap at least a portion of the obtuse-angled edge portion 112EO, are provided. In this manner, since an electrostatic capacitance is formed between the pixel electrode connecting portion 134 connected to the pixel electrode 112 and the capacitance forming portion 133 overlapping the via third insulating film which is an insulating film, the charged potential of the pixel electrode 112 can be held. In the obtuse-angled edge portion 112EO included in the outer peripheral edge portion of the pixel electrode 112, in addition to the connectable portion 136, the edge light shielding portion 39 continuous with the capacitance forming portion 133 is disposed so as to overlap. Therefore, display defects due to disordered alignment of the liquid crystal molecules are further unlikely to be visually recognized.

The edge light shielding portion 39 includes the first edge light shielding portion 39A continuous with a portion of the capacitance forming portion 133 that overlaps the first alignment boundary portion 38A, and the second edge light shielding portion 39B continuous with a portion of the capacitance forming portion 133 that overlaps the second alignment boundary portion 38B. The second edge light shielding portion 39B is disposed at a position interposing the second alignment boundary portion 38B between the second edge light shielding portion 39B and the connectable portion 136. In this manner, the first edge light shielding portion 39A is disposed so as to overlap the obtuse-angled edge portion 112EO along the extending direction of the source wiring 114 of the outer peripheral edge portion of the pixel electrode 112, whereas the connectable portion 136 and the second edge light shielding portion 39B are disposed so as to overlap the obtuse-angled edge portion 112EO along the extending direction of the gate wiring 113. Here, for example, in a configuration in which the plurality of pixel electrodes 112 and the like are disposed in the extending direction of the source wiring 114, even in a case where the first transistors 111 and the second transistors 135 are arranged in a zigzag pattern, the second edge light shielding portion 39B and the connectable portion 136 are disposed so as to interpose the second alignment boundary portion 38B therebetween. Therefore, either the connectable portion 136 or the second edge light shielding portion 39B can be overlapped the obtuse-angled edge portion 112EO along the extending direction of the gate wiring 113. As a result, display defects due to disordered alignment of the liquid crystal molecules are further unlikely to be visually recognized.

Other Embodiments

The technique disclosed in this specification is not limited to the embodiments described by the above description and the drawings, and the following embodiments are also included in the technical scope, for example.

(1) The connectable portions 36 and 136 may be formed of the first metal film 21. In a case where the connection portions of the first drain electrode 11C and the pixel electrode connecting portions 34 and 134 to the connectable portions 36 and 136 are formed of another metal film, the connectable portions 36 and 136 can be formed of the third metal film 27.

(2) The connectable portions 36 and 136 may be directly connectable to the pixel electrodes 12 and 112 without the pixel electrode connecting portions 34 and 134. In that case, it is possible to omit the pixel electrode connecting portions 34 and 134.

(3) In a case where the pixel electrode connecting portions 34 and 134 are omitted in the above (2), the first drain electrode 11C is directly connected to the pixel electrodes 12 and 112.

(4) In the second connectable portions 37 and 137, the first overlapping portions 37A and 137A overlapping the first source electrodes 11B and 111B may be formed of the third metal film 27. In that case, in order to prevent the first overlapping portions 37A and 137A from being short-circuited with the pixel electrode connecting portions 34 and 134 formed of the same third metal film 27, it is preferable that a sufficient interval is provided between the first overlapping portions 37A and 137A and the pixel electrode connecting portions 34 and 134.

(5) The second connectable portions 37 and 137 may have a configuration in which the first overlapping portions 37A and 137A formed of the first metal film 21 are disposed so as to overlap the pixel electrode connecting portions 34 and 134 in addition to the first source electrodes 11B and 111B, and the above second overlapping portions 37B and 137B are omitted. In that case, the overlap location of the first overlapping portions 37A, 137A and the pixel electrode connecting portions 34, 134 may be irradiated with the laser beam so as to short-circuit these portions.

(6) The connectable portions 36 and 136 may be connected to the second drain electrodes 35C and 135C or the pixel electrode connecting portions 34 and 134 in advance. In that case, the portions not connected in advance to the connectable portions 36 and 136, and the connectable portions 36 and 136 are short circuited by the irradiation with the laser beam, of the second drain electrodes 35C and 135C and the pixel electrode connecting portions 34 and 134.

(7) In the above (6), in a case where the connectable portions 36 and 136 are connected to the second drain electrodes 35C and 135C or the pixel electrode connecting portions 34 and 134 in advance, it is conceivable to form a contact hole having an opening in the third insulating film 26 interposed therebetween. In addition, in a case where the connectable portions 36 and 136 are connected to the second drain electrodes 35C and 135C in advance, it is also conceivable that a portion of the second drain electrodes 35C and 135C is a metal portion formed of the first metal film 21 or the second metal film 25, and a portion of the metal portion is disposed so as to overlap the pixel electrode connecting portions 34 and 134 formed of the third metal film 27 as the connectable portions 36 and 136. In a case where the connectable portions 36 and 136 are connected to the pixel electrode connecting portions 34 and 134 in advance, it is also conceivable that a portion of the second drain electrodes 35C and 135C is a metal portion formed of the first metal film 21 or the second metal film 25, and the connectable portions 36 and 136 integrated with the pixel electrode connecting portions 34 and 134 are disposed so as to overlap the metal portion.

(8) Besides the zigzag arrangement, the first transistors 11 and 111 and the second transistors 35 and 135 may have a matrix arrangement in which the pixel portions PX adjacent to each other in the Y axis direction have the same arrangement in the X axis direction. In that case, it is preferable that the connectable portions 36 and 136 and the second connectable portions 37 and 137 are similarly arranged in a matrix.

(9) In the configuration of Embodiment 2 described above, the setting of the tilt direction of the liquid crystal molecules in each domain PXD of the pixel portion PX can be appropriately changed. For example, when a voltage is applied to the liquid crystal layer 10C of the four domains PXD forming the pixel portion PX, the tilt direction of the liquid crystal molecules near the center in the thickness direction of the liquid crystal layer 10C may be set to be an arrangement opposite to that in Embodiment 2. In that case, it is preferable that the arrangement of the edge light shielding portion 39 on the longitudinal side is opposite to that in Embodiment 2.

(10) In addition to the above (9), the tilt direction of the liquid crystal molecules in the four domains PXD may be set so as to be toward the center of the pixel portion PX. In that case, since the azimuth direction orthogonal to the edge portion and directed toward the inside of the pixel electrode 112 forms an acute angle with the tilt direction of the liquid crystal molecules over the entire outer peripheral edge portion of the pixel electrode 112, a dark portion is unlikely to occur near the outer peripheral edge portion over the entire circumference. Therefore, in this configuration, the edge light shielding portion 39 can be omitted.

(11) In addition to the above (9) and (10), the tilt directions of the liquid crystal molecules in the four domains PXD may be set to radially outward from the center of the pixel portion PX. In that case, since the azimuth direction orthogonal to the edge portion and directed toward the inside of the pixel electrode 112 forms an obtuse angle with the tilt direction of the liquid crystal molecules over the entire outer peripheral edge portion of the pixel electrode 112, a dark portion is likely to occur near the entire outer peripheral edge portion over the entire circumference. In such a configuration, it is preferable to dispose the edge light shielding portion 39 on the longitudinal side so as to overlap the edge portion 112EL on the longitudinal side of the pixel electrode 112 over the entire length.

(12) In the configuration of Embodiment 2 described above, the number of domains PXD of the pixel portion PX may be other than 4 (for example, 2, 6, or 8).

(13) It is also possible to omit the lower layer side gate wiring 17 and form the gate wirings 13 and 113 in a single layer structure. Even in that case, by installing the lower layer side first gate electrode 11E connected to the first gate electrode 11A and the lower layer side second gate electrode 35E connected to the second gate electrode 35A, the first transistors 11 and 111 and the second transistors 35 and 135 can be double gate type, and it is not necessarily limited thereto. That is, the lower layer side first gate electrode 11E and the lower layer side second gate electrode 35E can be omitted. In addition, the lower layer side first gate electrode 11E and the lower layer side second gate electrode 35E can be disconnected from the first gate electrode 11A and the second gate electrode 35A, and can be left as light shielding portions for the first channel region 11D and the second channel region 35D. In a case where the lower layer side first gate electrode 11E and the lower layer side second gate electrode 35E are omitted or a case of disconnecting from the first gate electrode 11A and the second gate electrode 35A, the first transistors 11 and 111 and the second transistors 35 and 135 are top gate type in both case.

(14) It is also possible to omit the resistance lowering source wiring 31 and form the source wirings 14 and 114 in a single layer structure.

(15) In the first transistors 11 and 111 and the second transistors 35 and 135, each of the first source electrodes 11B and 111B, the first drain electrode 11C, the second source electrodes and the second drain electrodes 35C and 135C may be formed of the third metal film 27. In that case, the semiconductor film 23 may not include the resistance lowering region 23L.

(16) The first transistors 11 and 111 and the second transistors 35 and 135 may be bottom gate type.

(17) The number of laminated layers and materials of the plurality of insulating films 22, 24, 26, 28, and 29 provided on the array substrates 10A and 110A can be appropriately changed. For example, the fifth insulating film 29 formed of an organic insulating material may be omitted, and all the insulating films 22, 24, 26, and 28 may be formed of an inorganic insulating material.

(18) The specific wiring routes of the source wirings 14 and 114 and the gate wirings 13 and 113 can be appropriately changed. Similarly, the specific wiring route of the capacitance wiring 32 can be appropriately changed.

(19) The material of the semiconductor film 23 may be amorphous silicon or polysilicon (LTPS).

(20) The pixel electrodes 12 and 112 may have a horizontally longitudinal shape. The pixel electrodes 12 and 112 may have a non-longitudinal planar shape such as a square.

(21) The specific screen size and resolution of the liquid crystal panel 10 can be appropriately changed.

(22) The specific array pitch of the pixel portions PX in the liquid crystal panel 10 can be appropriately changed.

(23) The liquid crystal material forming the liquid crystal layer 10C may be a positive type liquid crystal material having a positive anisotropy of dielectric constant.

(24) It is also possible to add a polymerizable component such as a photopolymerizable monomer into the liquid crystal material forming the liquid crystal layer 10C. For example, a liquid crystal material in which a polymerizable component is premixed is sealed between a pair of substrates, and then the polymerizable component is polymerized to form an alignment sustaining layer on the alignment film. Therefore, it is also possible to use a polymer sustained alignment (PSA) technique for imparting a pretilt angle to the liquid crystal material (liquid crystal molecule).

(25) The display mode of the liquid crystal panel 10 may be TN mode, FFS mode, IPS mode, or the like.

(26) The liquid crystal panel 10 may be a reflective type or a semi-transmissive type.

(27) In addition to the liquid crystal panel 10, the type of display panel may be an organic EL display panel or the like.

The invention claimed is:

1. A display device comprising:
a gate wiring;
a source wiring that extends so as to intersect the gate wiring;
a pixel electrode that is disposed adjacent to both the gate wiring and the source wiring;
a first transistor that includes a first gate electrode continuous with the gate wiring, a first source electrode connected to the source wiring, a first drain electrode connected to the pixel electrode, and a first channel region connected to the first source electrode and the first drain electrode and disposed so as to overlap the first gate electrode insulating film, in which the first gate electrode has a portion of the gate wiring not overlapping the source wiring;
a second transistor that includes a second gate electrode continuous with the gate wiring, a second source electrode connected to the source wiring, a second drain electrode separated from the pixel electrode, and a second channel region connected to the second source electrode and the second drain electrode and disposed so as to overlap the second gate electrode via an insulating film, in which the second gate electrode has a portion of the gate wiring intersecting the source wiring; and
a connectable portion that is connectable to the second drain electrode and the pixel electrode; wherein
the gate wiring is formed of a gate metal film, the source wiring is formed of a source metal film disposed in a different layer from the gate metal film via an insulating film, in the first transistor and the second transistor, the first channel region and the second channel region are formed of a semiconductor film so as to be disposed in a different layer from the gate metal film and the source metal film via an insulating film, respectively, at least a portion of the second drain electrode is a source metal portion formed of the source metal film, and a pixel electrode connecting portion formed of the source metal film is connected to the pixel electrode, and
the connectable portion is formed of the gate metal film and is disposed so as to overlap the source metal portion and the pixel electrode connecting portion via an insulating film.

2. The display device according to claim 1, wherein
at least two pixel electrodes, each of which is the pixel electrode that is disposed adjacent to both the gate wiring and the source wiring, are disposed so as to interpose the gate wiring,
the display device further comprising:
a second connectable portion that is connectable to one of the pixel electrodes disposed to interpose the gate wiring with respect to another of the pixel electrodes which is a connection target of the first transistor and the second transistor that are connected to the gate wiring, and that is disposed so as to overlap the first source electrode via an insulating film.

3. The display device according to claim 2, wherein
the gate wiring is formed of a gate metal film, the source wiring is formed of a source metal film disposed in a different layer from the gate metal film via an insulating film, the first transistor and the second transistor are formed of a semiconductor film in which the first channel region and the second channel region are disposed in a different layer from the gate metal film and the source metal film via an insulating film, respectively, at least a portion of the second drain electrode is a source metal portion formed of the source metal film, and a pixel electrode connecting portion formed of the source metal film is connected to the pixel electrode, and
the connectable portion is formed of the gate metal film and is disposed so as to overlap the source metal portion and the pixel electrode connecting portion via an insulating film, and at least a portion of the second connectable portion is formed of the gate metal film and is disposed so as to overlap the pixel electrode connecting portion via an insulating film.

4. A display device comprising:
a gate wiring;
a source wiring that extends so as to intersect the gate wiring;

a pixel electrode that is disposed adjacent to both the gate wiring and the source wiring;

a first transistor that includes a first gate electrode continuous with the gate wiring, a first source electrode connected to the source wiring, a first drain electrode connected to the pixel electrode, and first channel region connected to the first source electrode and the first drain electrode and disposed so as to overlap the first gate electrode via an insulating film, in which the first gate electrode has a portion of the gate wiring not overlapping the source wiring;

a second transistor that includes a second gate electrode continuous with the gate wiring, a second source electrode connected to the source wiring, a second drain electrode separated from the pixel electrode, and a second channel region connected to the second source electrode and the second drain electrode and disposed so as to overlap the second gate electrode via an insulating film, in which the second gate electrode has a portion of the gate wiring intersecting the source wiring; and a connectable portion that is connectable to the second drain electrode and pixel electrode; wherein a widened portion is provided in the gate wiring at a position not overlapping the source wiring.

5. The display device according to claim 4, further comprising:

a liquid crystal layer; and a spacer that is disposed to penetrate the liquid crystal layer and holds a thickness of the liquid crystal layer, the spacer being disposed so as to overlap the widened portion.

6. The display device according to claim 4, wherein the gate wiring is formed of a gate metal film, the source wiring is formed of a source metal film disposed in a different layer from the gate metal film via an insulating film, in the first transistor and the second transistor, the first channel region and the second channel region are formed of a semiconductor film so as to be disposed in a different layer from the gate metal film and the source metal film via an insulating film, respectively, at least a portion of the second drain electrode is a source metal portion formed of the source metal film, and a pixel electrode connecting portion formed of the source metal film is connected to the pixel electrode, and the connectable portion is formed of the gate metal film and is disposed so as to overlap the source metal portion and the pixel electrode connecting portion via an insulating film.

7. The display device according to claim 4, wherein at least two pixel electrodes, each of which is the pixel electrode that is disposed adjacent to both the gate wiring and the source wiring, are disposed so as to interpose the gate wiring, the display device further comprising:

a second connectable portion that is connectable to one of the pixel electrodes disposed to interpose the gate wiring with respect to another of the pixel electrodes which is a connection target of the first transistor and the second transistor that are connected to the gate wiring, and that is disposed so as to overlap the first source electrode via an insulating film.

8. The display device according to claim 4, wherein in the first transistor and the second transistor, the first channel region and the second channel region are formed of a semiconductor film disposed in a different layer from the source wiring via an insulating film, and the first source electrode, the first drain electrode, the second source electrode, and the second drain electrode are formed of a resistance lowering region obtained by lowering a resistance in a portion of the semiconductor film.

9. The display device according to claim 8, wherein the gate wiring, the first gate electrode, and the second gate electrode are formed of a gate metal film disposed on an upper layer side of the semiconductor film via an insulating film, and a portion of the semiconductor film not overlapping the gate metal film is the resistance lowering region.

10. The display device according to claim 9, wherein the first transistor includes a lower layer side first gate electrode that is formed of a lower layer side gate metal film disposed on a lower layer side of the semiconductor film via an insulating film, that is disposed so as to overlap the first channel region, and that is connected to the first gate electrode, and the second transistor includes a lower layer side second gate electrode that is formed of the lower layer side gate metal film, that is disposed so as to overlap the second channel region, and that is connected to the second gate electrode.

11. The display device according to claim 10, further comprising:

a lower layer side gate wiring that is formed of the lower layer side gate metal film, that is disposed so as to overlap the gate wiring, and that is connected to the gate wiring, the lower layer side first gate electrode, and the lower layer side second gate electrode.

12. The display device according to claim 8, further comprising:

a resistance lowering source wiring that is formed of the resistance lowering region, is disposed so as to overlap the source wiring, and is connected to the source wiring.

13. A display device comprising:

comprising:

a gate wiring;

a source wiring that extends so as to intersect the gate wiring;

a pixel electrode that is disposed adjacent to both the gate wiring and the source wiring;

a first transistor that includes a first gate electrode continuous with the gate wiring, a first source electrode connected to the source wiring, a first drain electrode connected to the pixel electrode, and a first channel region connected to the first source electrode and the first drain electrode and disposed so as to overlap the first gate electrode via an insulating film, in which the first gate electrode has a portion of the gate wiring not overlapping the source wiring;

a second transistor that includes a second gate electrode continuous with the gate wiring, a second source electrode connected to the source wiring, a second drain electrode separated from the pixel electrode, and a second channel region connected to the second source electrode and the second drain electrode and disposed so as to overlap the second gate electrode via an insulating film, in which the second gate electrode has a portion of the gate wiring intersecting the source wiring;

a connectable portion that is connectable to the second drain electrode and the pixel electrode;

a liquid crystal layer that includes liquid crystal molecules;

a plurality of domains having different alignment directions of the liquid crystal molecules when a voltage is applied to the liquid crystal layer;

an alignment boundary portion that is located at a boundary of the plurality of domains;

an alignment film that aligns the liquid crystal molecules; and a pixel electrode connecting portion that is connected to the pixel electrode and is connectable to the connectable portion, wherein the alignment boundary portion is configured to include a first alignment boundary portion extending along an extending direction of the gate wiring and a second alignment boundary portion extending along an extending direction of the source wiring, and the pixel electrode connecting portion has a light shielding property and is disposed so as to overlap the first alignment boundary portion and the second alignment boundary portion.

14. The display device according to claim 13, wherein the connectable portion is disposed so as to overlap at least a portion of an obtuse-angled edge portion which is an edge portion included in an outer peripheral edge portion of the pixel electrode and in which an azimuth direction orthogonal to the edge portion and directed toward an inside of the pixel electrode forms an obtuse angle with respect to a tilt direction of the liquid crystal molecules when a voltage is applied to the liquid crystal layer.

15. The display device according to claim 14, further comprising:

a capacitance forming portion that is disposed so as to overlap the pixel electrode connecting portion via an insulating film; and an edge light shielding portion that is continuous with the capacitance forming portion and that is disposed so as to overlap at least a portion of the obtuse-angled edge portion.

16. The display device according to claim 15, wherein the edge light shielding portion includes a first edge light shielding portion continuous with a portion of the capacitance forming portion overlapping the first alignment boundary portion, and a second edge light shielding portion continuous with a portion of the capacitance forming portion overlapping the second alignment boundary portion, and the second edge light shielding portion is disposed at a position interposing the second alignment boundary portion between the second edge light shielding portion and the connectable portion.

17. The display device according to claim 13, wherein the gate wiring is formed of a gate metal film, the source wiring is formed of a source metal film disposed in a different layer from the gate metal film via an insulating film, in the first transistor and the second transistor, the first channel region and the second channel region are formed of a semiconductor film so as to be disposed in a different layer from the gate metal film and the source metal film via an insulating film, respectively, at least a portion of the second drain electrode is a source metal portion formed of the source metal film, and a pixel electrode connecting portion formed of the source metal film is connected to the pixel electrode, and the connectable portion is formed of the gate metal film and is disposed so as to overlap the source metal portion and the pixel electrode connecting portion via an insulating film.

18. The display device according to claim 13, wherein at least two pixel electrodes, each of which is the pixel electrode that is disposed adjacent to both the gate wiring and the source wiring, are disposed so as to interpose the gate wiring, the display device further comprising:

a second connectable portion that is connectable to one of the pixel electrodes disposed to interpose the gate wiring with respect to another of the pixel electrodes which is a connection target of the first transistor and the second transistor that are connected to the gate wiring, and that is disposed so as to overlap the first source electrode via an insulating film.

19. The display device according to claim 13, wherein in the first transistor and the second transistor, the first channel region and the second channel region are formed of a semiconductor film disposed in a different layer from the source wiring via an insulating film, and the first source electrode, the first drain electrode, the second source electrode, and the second drain electrode are formed of a resistance lowering region obtained by lowering a resistance in a portion of the semiconductor film.

20. The display device according to claim 13, wherein a widened portion is provided in the gate wiring at a position not overlapping the source wiring.

* * * * *